United States Patent
Wang

(10) Patent No.: US 11,835,113 B2
(45) Date of Patent: Dec. 5, 2023

(54) GEAR PAIR AND NUTATION REDUCER

(71) Applicant: Hong Jiang, Beijing (CN)

(72) Inventor: Xiaochun Wang, Beijing (CN)

(73) Assignee: Hong Jiang, Beijing (CN)

( * ) Notice: Subject to any disclaimer, the term of this patent is extended or adjusted under 35 U.S.C. 154(b) by 0 days.

(21) Appl. No.: 18/219,704

(22) Filed: Jul. 9, 2023

(65) Prior Publication Data

US 2023/0349446 A1 Nov. 2, 2023

Related U.S. Application Data

(63) Continuation of application No. PCT/CN2022/094547, filed on May 23, 2022.

(30) Foreign Application Priority Data

Dec. 22, 2021 (CN) .......................... 202111579019.2

(51) Int. Cl.
| | | |
|---|---|---|
| F16H 1/32 | (2006.01) | |
| F16H 57/02 | (2012.01) | |
| F16H 55/08 | (2006.01) | |

(52) U.S. Cl.
CPC ............. F16H 1/321 (2013.01); F16H 55/08 (2013.01); F16H 57/02 (2013.01); *F16H 2057/02034* (2013.01)

(58) Field of Classification Search
CPC .......... F16H 1/321; F16H 55/08; F16H 57/02; F16H 2057/02034
See application file for complete search history.

(56) References Cited

U.S. PATENT DOCUMENTS

| | | | |
|---|---|---|---|
| 2009/0064812 A1* | 3/2009 | Gutmann | F16H 55/08 74/462 |
| 2017/0191549 A1* | 7/2017 | Atmur | F16H 1/321 |
| 2020/0300316 A1 | 9/2020 | Atmur et al. | |
| 2021/0310552 A1 | 10/2021 | Shuai et al. | |
| 2021/0324948 A1* | 10/2021 | Zhang | F16C 33/581 |
| 2022/0412437 A1* | 12/2022 | Bostan | F16H 1/34 |

FOREIGN PATENT DOCUMENTS

| | | |
|---|---|---|
| CN | 1831372 A | 9/2006 |
| CN | 106523599 A | 3/2017 |
| CN | 110836246 A | 2/2020 |
| CN | 111219447 A | 6/2020 |
| CN | 113078773 A | 7/2021 |

(Continued)

OTHER PUBLICATIONS

Notice of Allowance of counterpart Chinese Patent Application No. 202111579019.2 dated Apr. 7, 2023.

(Continued)

*Primary Examiner* — Colby M Hansen

(57) ABSTRACT

A gear pair and nutation reducer are provided. The gear pair is formed by a pin gear and a non-instantaneous-pole enveloping gear in meshing engagement with each other, the effective tooth surface of the pin gear being constructed of an elliptical cone segment that is outwardly convex, and the distance between the highest and lowest points on the elliptical cone segment in the same cross-section gradually decreases inwardly along the generatrix of the reference cone of the pin gear.

15 Claims, 18 Drawing Sheets

(56) References Cited

FOREIGN PATENT DOCUMENTS

| CN | 114198464 A | 3/2022 |
| JP | 2016017607 A | 2/2016 |
| JP | 2021173299 A | 11/2021 |

OTHER PUBLICATIONS

1st Office Action of counterpart Chinese Patent Application No. 202111579019.2 dated Feb. 23, 2023.
International Search Report of PCT Patent Application No. PCT/CN2022/094547 dated Sep. 28, 2022.

\* cited by examiner

GEAR PAIR AND NUTATION REDUCER

CROSS-REFERENCES TO RELATED APPLICATIONS

This application is a Continuation Application of PCT Application No. PCT/CN2022/094547 filed on May 23, 2022, which claims priority to Chinese Patent Application No. 202111579019.2, entitled by "Gear pair and nutation reducer", filed on Dec. 22, 2021 before China National Intellectual Property Administration (CNIPA), which is incorporated herein by reference in its entirety.

FIELD OF INVENTION

The present invention relates to the field of reducers, and specially a gear pair and a nutation reducer.

BACKGROUND

Reducers with high transmission ratio are widely used in automatic field, such as various industrial robotic arms and manipulators. Commonly used reducers with high transmission ratio comprise: worm gear typed reducers, multi-stage planetary gear set typed reducers, harmonic reducers and RV reducers. For the situation where compact structure is required, the harmonic and RV reducers are mainly used at present. The first cause is that: the efficiency of the worm pair typed reducers is low and thus cannot satisfy the requirement of frequent high-speed operation due to the problem of thermal balance; the multi-stage planetary gear set typed reducers have a larger volume, and is associated with strict process requirement and high manufacturing cost for planetary reducers with low backlash. Nutation reducers appear much later and have not been manufactured as comparatively mutual products in series by far. From the published information up to now, most nutation reducers have gear pair with involute-profiled teeth. According to conventional technologies, the design of involute-profiled bevel gear pair should follow the principle that the pitch cones in the gear pair is in tangent with each other. Thus, if high transmission ratio is required, one gear in the gear pair has to be an internal bevel gear, which may be difficult to manufacture and associated with high manufacturing cost. A further disadvantage inherent in the involute gearing is that the overlap ratio is too low to no more than 3 teeth pairs being simultaneously in meshing engagement. Even though every gear tooth could be designed to have a large load capacity if considering contact stress between a pair of teeth, the power density of the reducer can hardly be improved due to limiting of bending and sheering stress in the root of the teeth. Nutation cycloid gear drive is easy to establish a high-transmission-ratio structure by one-teeth-difference, and it could be manufactured as gear pair of end face drive type by compulsive addendum modification. However, it has disadvantage of tendency of local wearing during long term operation, as the arc length of effective part on the tooth flank of the pin gear is rather short. It further has disadvantage of high contact stress in tooth flanks due to great relative curvature between the contacted tooth pair, although much more tooth pairs can get into engagement at the same time.

SUMMARY

In view of what mentioned above, according to the present disclosure, a gear pair and a nutation reducer is provided, to solve such existing problems in prior art nutation reducers that they tends to be locally wore during long term operation due to rather short arc length of effective part on the tooth flank of the pin gear, and that the contact stress in tooth flanks is high due to great relative curvature between the contacted tooth pair, although much more tooth pairs can get into engagement at the same time.

To achieve the purpose mentioned above, technical solutions are provided as follows:

A first aspect of the present disclosure provides a gear pair comprising a pin gear and a non-instantaneous-pole enveloping gear which are in meshing engagement with each other, wherein an effective tooth surface of said pin gear is formed by an elliptical cone segment which is outwardly convex, in which surface segment the distance between the highest and lowest points in the same cross-section gradually decreases inwardly along the generatrix of the radially of said pin gear; wherein said effective tooth surface of said non-instantaneous-pole enveloping gear is the non-instantaneous-pole envelope of said pin gear in the non-instantaneous-pole enveloping process which is created on the meshing gear during the notational movement between the gear pair.

Optionally, said pin gear has a tooth surface comprising a curved tooth-tip segment, said elliptical cone segment, a flat plane segment, and a curved tooth-root segment, wherein said elliptical cone segment, said plane segment and said tooth-root segment are consecutively arranged one beside another at both ends of said tooth-tip segment, wherein every adjacent two of said tooth-tip segment, said elliptic conical surface segment, said plane segment and said tooth-root segment are tangent to each other, wherein said tooth-tip segment is smoothly convexly curved, and said tooth-root surface is smoothly concavely curved; and wherein said non-instantaneous-pole enveloping gear has a tooth surface comprising a curved tooth-tip surface, a non-instantaneous-pole enveloping tooth surface, a flat plane segment and a curved tooth-root segment, wherein said non-instantaneous-pole enveloping tooth surface, said plane segment and said tooth-root segment are consecutively arranged one beside another at both ends of said tooth-tip segment, every adjacent two of said tooth-tip segment, said non-instantaneous-pole enveloping tooth surface, said plane segment and said tooth-root segment are tangent to each other, said tooth-tip segment is smoothly convexly curved, and said tooth-root segment is smoothly concavely curved.

Optionally, said tooth-tip segment and said tooth-root segment each are formed by spline surface.

Optionally, the shaft angle T between the axis of said pin gear and that of said non-instantaneous-pole enveloped gear lies within a range of $177° \leq T \leq 180°$.

Optionally, ratio of a major axis to a minor axis in elliptical conical surface lies within a range of 1.3 to 2.5.

Optionally, said pin gear has a tooth depth which gradually decreases radially inwardly.

Optionally, said effective tooth surface of said pin gear has a pressure angle $\alpha$ that satisfies requirement of $40°-R \leq \alpha \leq 50°-R$, where R is the friction angle between the tooth surface of said pin gear and that of said non-instantaneous-pole enveloping gear.

Optionally, said pin gear has a first reference cone between its face cone and root cone, wherein axis of said first reference cone is coincident with that of said pin gear, and wherein said first reference cone has a cone angle $\beta$; said non-instantaneous-pole enveloping gear has a second reference cone between its face cone and root cone, wherein axis of said second reference cone is coincident with that of said non-instantaneous-pole enveloping gear, and wherein said second reference cone has a cone angle W; said gear pair has a shaft angle T between axis of said pin gear and that of said non-instantaneous-pole enveloped gear, said pin gear has a face angle γ and a root angle P; said non-instantaneous-pole enveloping gear has a face angle K and a root angle L, the relationship between β, W, T, γ, K, L is described as follows:

$$89°≤β≤91°, W=T-β, β+0.3°≤γ≤β+2.1°,$$
$$β-2.9°≤P≤β-0.5°, W+0.3°≤K≤W+2.3°,$$
$$W-3.1°≤L≤W-0.6°.$$

A second aspect of the present disclosure provides a nutation reducer comprising: a case; an output shaft rotationally provided in said case; a gear pair as presented in the first aspect, wherein said non-instantaneous-pole enveloping gear is provided in said case in a fixed manner, or integrally formed with said case; an annular spring film, having an inner ring provided with a first connecting part fixed to said output shaft, an outer ring provided with a second connecting part fixed to said pin gear, and an annular elastically deformable portion connected between said inner and outer rings, wherein said inner ring is coaxial with said output shaft of said reducer, while said outer ring is coaxial with said pin gear; an actuator mechanism for nutational movement, provided in said case, to actuate said pin gear to perform nutational movement such that teeth of said pin gear roll on teeth of said non-instantaneous-pole enveloping gear and said annular elastically deformable portion deforms to adapt said nutational movement of said pin gear.

Optionally, said nutation reducer further comprises an input shaft of said reducer, which is rotationally provided in said case; wherein said actuator mechanism for nutational movement comprises a rotatable tilted disc provided on said input shaft of said reducer, wherein one side of said tilted disc forms a tilted plane, while the other side is perpendicular to axis of said tilted disc; a driving mechanism driving said tilted disc to rotate; planar high-density ball bearings provided at both sides of said tilted disc; an annular raised platform radially inwardly protruded from an inner surface of said case around said input shaft, wherein the side of said platform contacts said planar high-density ball bearing, the side of said platform is perpendicular to axis of said input shaft; wherein the end face of said platform, the back side of said pin gear, and both sides of said tilted disc serve as raceways for said planar high-density ball bearings.

Optionally, said driving mechanism is an electric motor, the output shaft of which is fixed to said tilted disc and thus used as said input shaft of said reducer for driving said tilted disc to rotate.

Optionally, said case of said reducer serves as the housing for said electric motor, in which stator of said electric motor is embedded and within which rotor of said electric motor is rotationally provided.

Optionally, two gear pairs are provided such that they are arranged at two opposite sides of said actuator mechanism for nutational movement in a symmetric manner.

Optionally, said actuator mechanism for nutational movement comprises: a tilted disc rotationally provided in said case on said output shaft of said reducer and driven by an actuating mechanism, wherein two opposite sides of said tilted disc form a pair of symmetric tilted planes; planar high-density ball bearings provided at both sides of said tilted disc in a symmetric manner such that both sides of said tilted disc and back sides of said pin gears in each said two gear pairs serve as raceways for said planar high-density ball bearings; wherein said pin gears in said two gear pairs have the same number of teeth.

Optionally, an angle C is formed between said tilted plane of said tilted disc and axis of said tilted disc and a shaft angle T between axis of said pin gear and that of said non-instantaneous-pole enveloped gear, where C=T−90°.

Advantageous effect achieved including: the effective tooth surface of the pin gear in this application is designed as an elliptical cone segment, in comparison with nutational cycloid face gear drive, the arc length of effective part on the tooth flank of the pin gear is obviously enhanced. For the same gear diameter, gear ratio and output load, the length of effective tooth surface on pin gear can be increased by about 60%, so that the local wear in tooth flank of the pin gear is suppressed, and service life is increased. Further, in comparison with nutational cycloid face gear drive, for the gear pairs of the same gear diameter, gear ratio and gear load, the contact stress between tooth surfaces will be lowered by 23%, or under the same contact stress, load capacity can be increased by about 30%.

DESCRIPTION OF DRAWINGS

The above and other objects, features and advantages of the present disclosure will become more apparent by a detailed description of exemplary embodiments thereof with reference to the accompanying drawings. The accompanying drawings described below are only a part of embodiments of the present disclosure, and other drawings may be obvious to an ordinary skilled person in the art based on these drawings.

Figure 1:
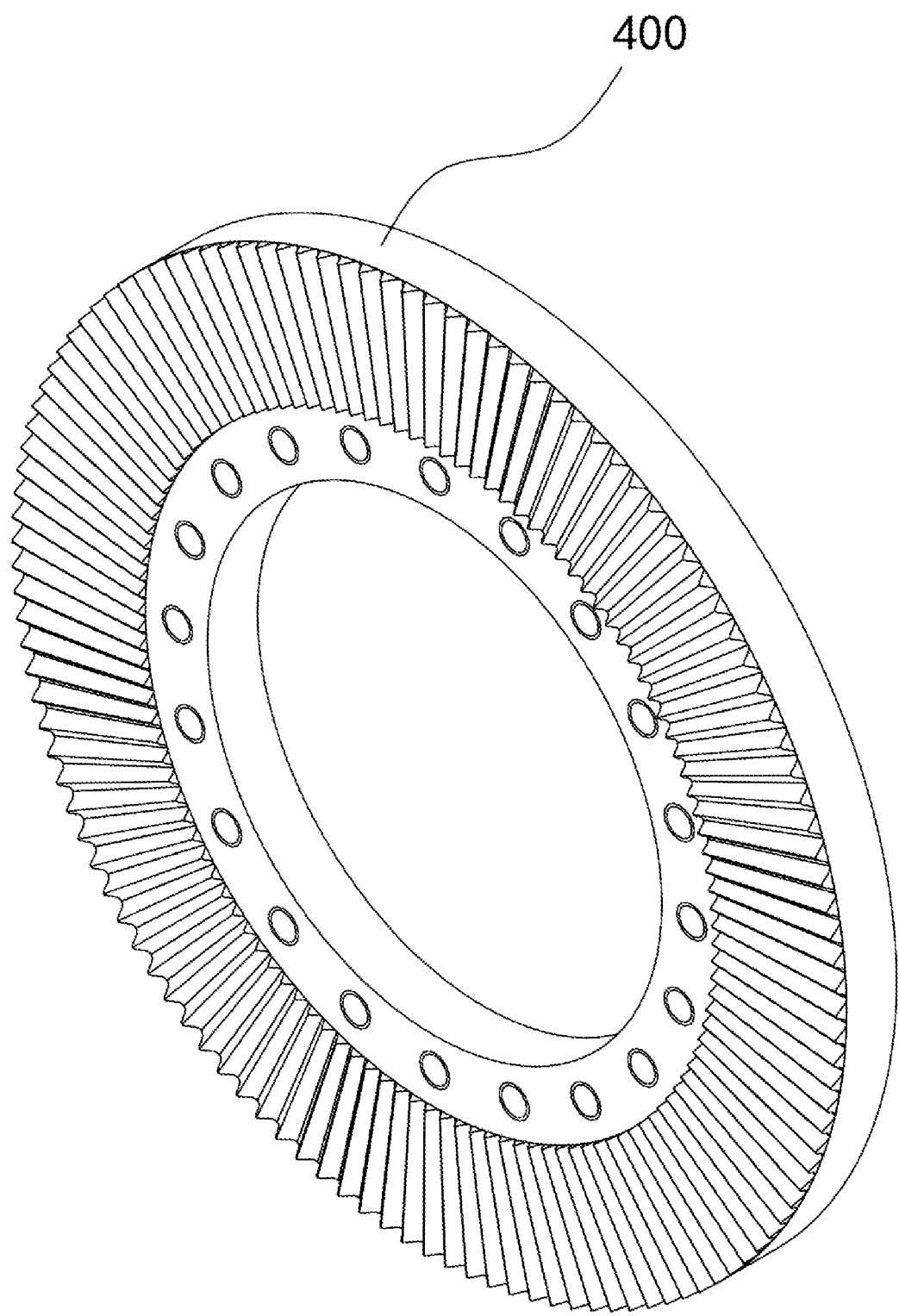
FIG. 1 is an isometric view of an embodiment of a pin gear in a gear pair according to the present disclosure.
Figure 2:
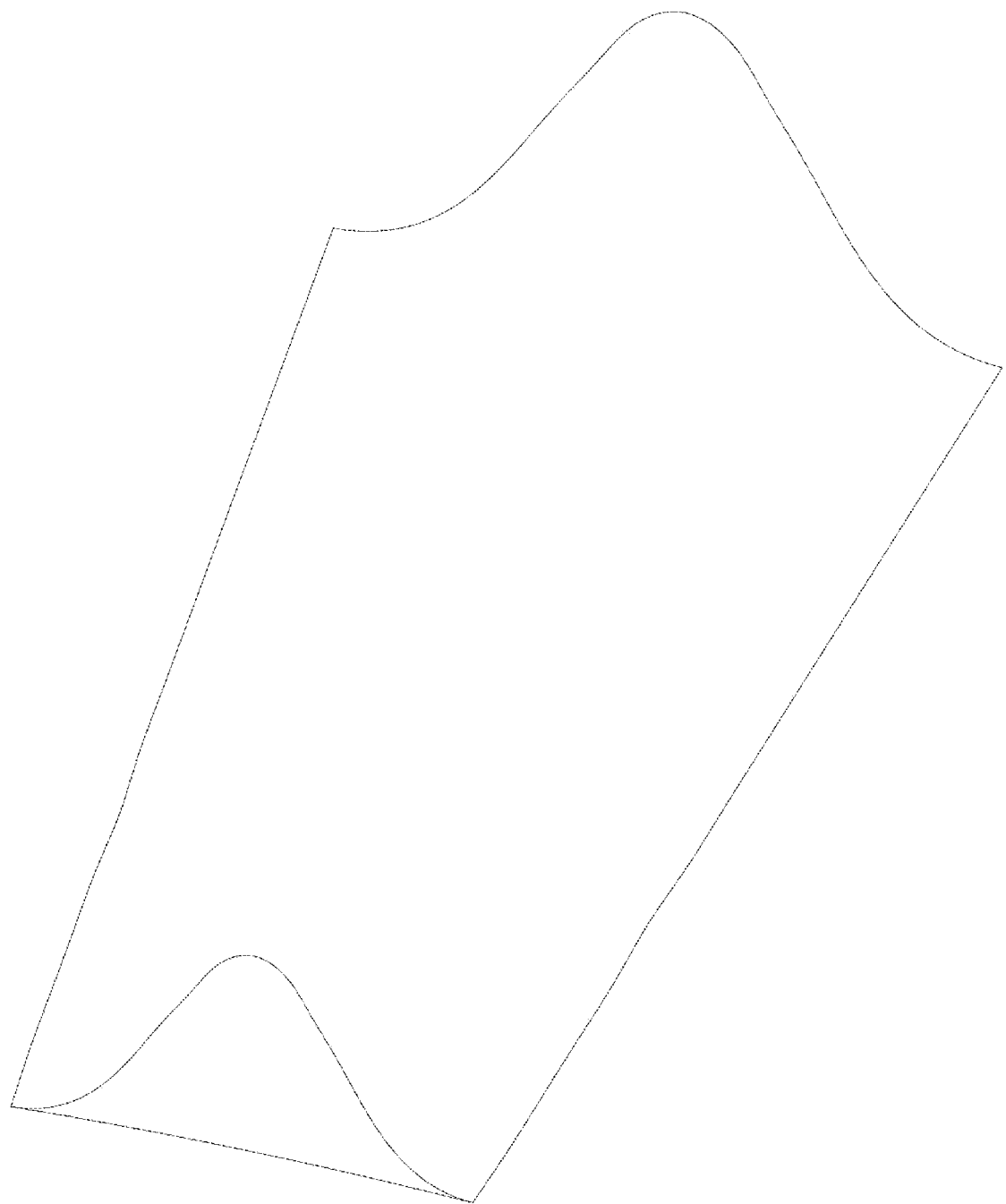
FIG. 2 is an isometric view of an embodiment of a single tooth of the pin gear presented in FIG. 1.
Figure 3:
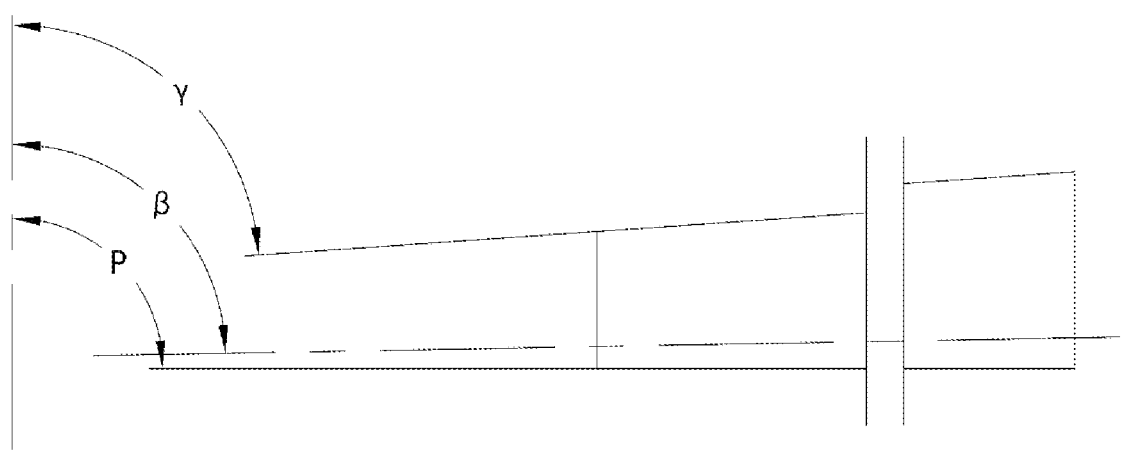
FIG. 3 is a front view of the embodiment of the single tooth of the pin gear presented in FIG. 2.
Figure 4:
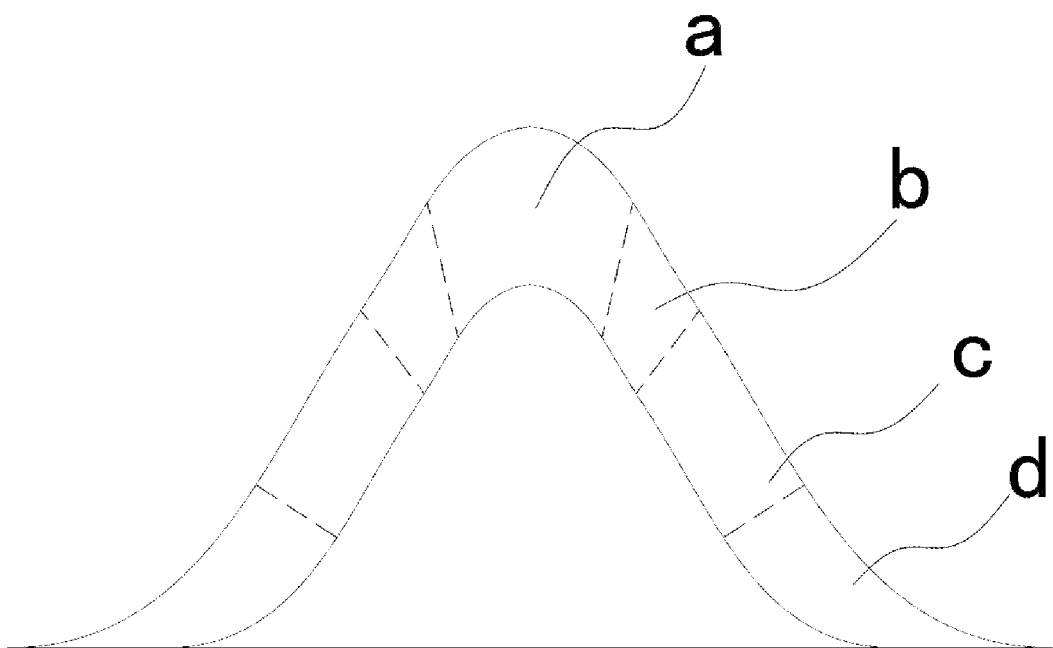
FIG. 4 is a left view of FIG. 3.
Figure 5:
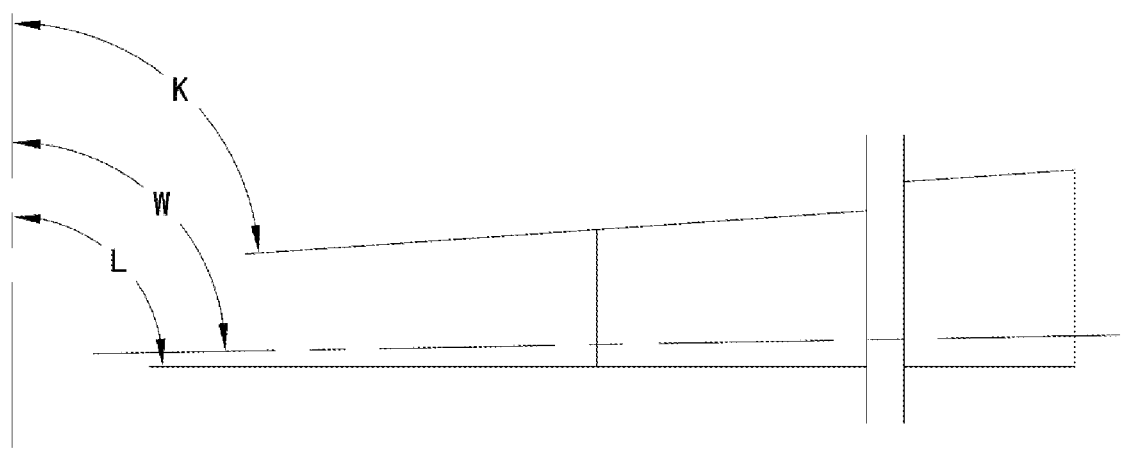
FIG. 5 is a front view of an embodiment of a single tooth of a non-instantaneous-pole enveloping gear in a gear pair according to the present disclosure.
Figure 6:
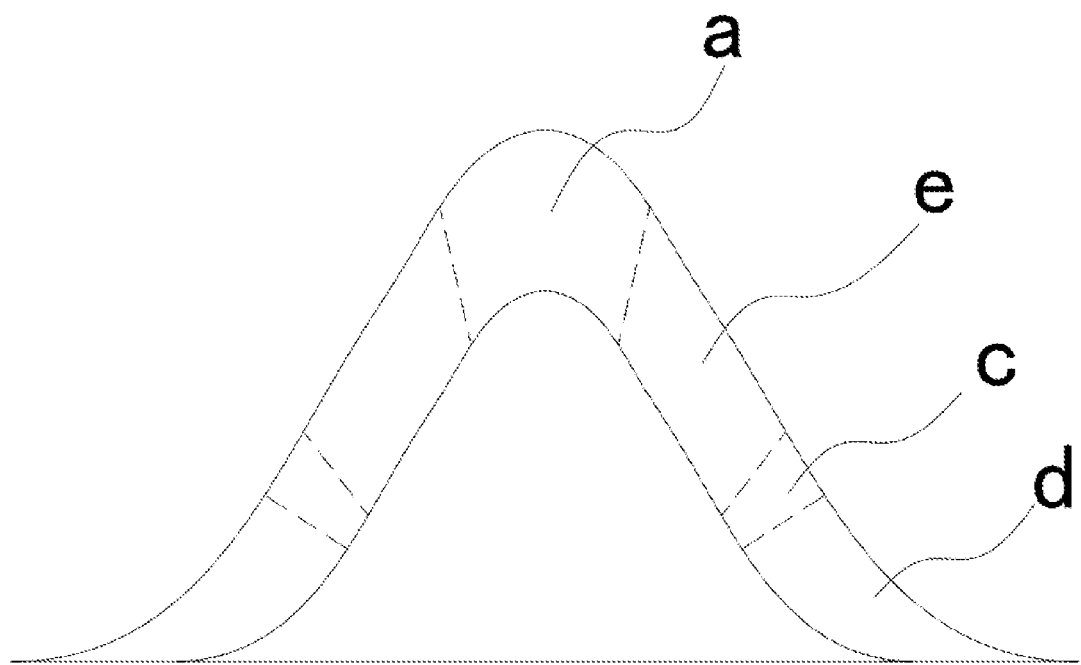
FIG. 6 is a left view of FIG. 5.
Figure 7:
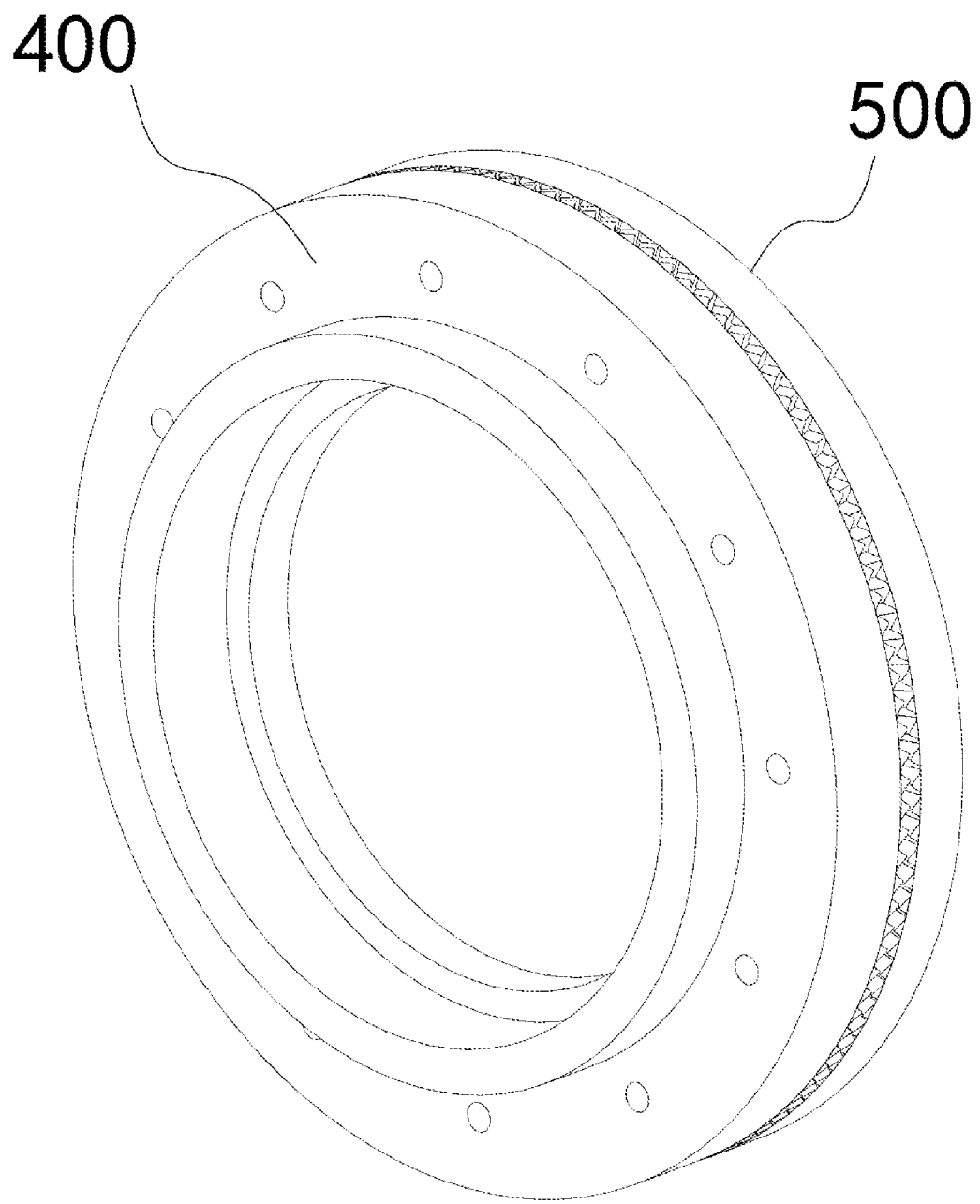
FIG. 7 is an overall isometric view of an embodiment of the gear pair according to the present disclosure.

Wherein the dotted lines in FIG. 4 and FIG. 6 are imaginary lines, which are added for purpose of illustrating the construction components of the tooth profile.

Reference numeral:

101-inner ring; 102-outer ring; 103-annular spring film; 200-planar high-density ball bearing; 201-ball holder; 202-ball; 300-case; 301-output shaft of the reducer; 400-pin gear; 401-effective tooth surface on pin gear; 402-second annular raceway; 500-non-instantaneous-pole enveloping gear; 501-effective tooth surface on non-instantaneous-pole enveloping gear; 600-tilted disc; 601-tilted plane; 602-first annular raceway; 900-electric motor; 901-pinion; a-curved tooth-tip segment; b-elliptical cone segment; c-flat plane segment; d-curved tooth-root segment; e-non-instantaneous-pole enveloping tooth surface; 710-third bearing; 711-first bearing; 712-second bearing; 713-fourth bearing; 714-end cover of the electric motor; 715-end cover of the bearing; 716-input shaft of the reducer; H-nutation reducer; 3011-first output shaft of the reducer; 3012-second output shaft of the reducer.

DETAILED DESCRIPTION OF INVENTION

In order to make the purpose, technical solutions and advantages of the embodiments of the present disclosure clearer, the technical solutions in the embodiments of the present disclosure will be described clearly and completely below in conjunction with the accompanying drawings of the embodiments of the present disclosure, and it is obvious that the described embodiments are a part of the embodiments of the present disclosure, rather than all of them. Based on the embodiments in the present disclosure, all other embodiments which may be obvious to an ordinary skilled person in the art will fall within the scope of protection of the present disclosure.

The terms as used herein are solely for the purpose of describing particular embodiments and are not intended to limit the present disclosure. The singular forms of "a", "said" and "the" as used in the specification and the appended claims are also intended to include plural forms, unless the context clearly indicates otherwise. Unless the context clearly indicates otherwise, "a plurality" generally includes at least two, but does not exclude at least one.

It should be understood that the term "and/or" as used herein is simply a description of the relationship of the associated items, indicating that three relationships can be comprises, for example, A and/or B can mean: A alone, both A and B, and B alone. In addition, the character "/" herein generally indicates that the item therebefore and the item thereafter are in an "or" relationship.

It should also be noted that the term "include," "comprise," or any other variation thereof is intended to cover non-exclusive inclusion, such that a product or system that includes a set of elements includes not only those elements, but also other elements not explicitly indicated, or also other elements that are inherently included in the product or system. Unless stated otherwise, an element qualified by the statement "comprise a . . . " does not preclude the existence of additional identical elements in the product or system including said element.

Prior-art nutational cycloid reducer is associated with the problems that the arc length of effective part on the tooth flank of the pin gear is rather short, leading to the problem that it tends to appear local wear during long term operation, and that the contact stress in tooth surfaces is high due to great relative curvature between the contact tooth pair, although much more tooth pairs can get into engagement at the same time.

The gear pair composed of a pin gear with the effective tooth surface being constructed of an outwardly convex elliptical cone segment and its mating gear with non-instantaneous-pole enveloping tooth surface is adopted in this disclosure, therefor, the length of effective part on pin gear tooth flank can be increased, contact stress is reduced, load capacity being enhanced, and wear extent on pin gear active tooth surfaces reduced.

To make a further exposition of the technical proposal in this disclosure, embodiments as follows are presented in reference to FIG. 1 to FIG. 18.

Embodiment 1

A gear pair is provided in this embodiment, as illustrated in FIG. 1 to FIG. 8, which gear pair comprises a pin gear 400 and a non-instantaneous-pole enveloping gear 500 which are in meshing engagement with each other. The effective tooth surface of the pin gear 400 is formed by an elliptical cone segment b which is outwardly convex, in which surface segment b, the distance between the highest point and the lowest point in the same cross section gradually decreases inwardly along the generatrix of the reference cone of the pin pear 400. The effective tooth surface of the non-instantaneous-pole enveloping gear 500 is a non-instantaneous-pole envelope for the pin gear 400 generated on the non-instantaneous-pole enveloping gear 500 during the nutational movement between the pin gear 400 and non-instantaneous-pole enveloping gear 500. The number of teeth of the pin gear 400 is one more than that of the non-instantaneous-pole enveloping gear 500.

In the context of the embodiment, the elliptical cone segment means a segment of a surface of a complete elliptical cone.

For this embodiment, the teeth of the pin gear 400 and of the non-instantaneous-pole enveloping gear 500 are respectively formed on an end face of the gear discs. The teeth each extend in radial direction of the respective gears discs and have a tooth thickness gradually increasing from the tooth tip towards the tooth root. The tooth width means the distance from the inner circumferential end face of the gear to outer circumferential end face of the same.

As illustrated in FIG. 4 and FIG. 6, the pin gear 400 has a tooth surface composed of a curved tooth-tip segment a, an elliptical cone segment b, a flat plane segment c and a curved tooth-root segment d, wherein the elliptical cone segment b, the plane segment c and the tooth-root segment d are consecutively arranged one beside another at both ends of the tooth-tip segment a, every adjacent two of the tooth-tip segment a, the elliptic conical surface segment b, the plane segment c and the tooth-root segment d are tangent to each other. The tooth-tip segment a is a smoothly convexly curved surface, while the tooth-root segment d is a smoothly concavely curved surface. The non-instantaneous-pole enveloping gear 500 has a tooth surface composed of a curved tooth-tip segment a, a non-instantaneous-pole enveloping surface e, a flat plane segment c and a curved tooth-root segment d, wherein the non-instantaneous-pole enveloping surface e, the plane segment c and the tooth-root segment d are consecutively arranged one beside another at both ends of the tooth-tip segment a, every adjacent two of the tooth-tip segment a, the non-instantaneous-pole enveloping surface e, the plane segment c and the tooth-root segment d are tangent to each other. The tooth-tip segment a is a smoothly convexly curved surface, while said tooth-root segment d is a smoothly concavely curved surface. The gear pair can satisfy the load capacity no matter the pin gear rotates in clockwise or anticlockwise direction. It is preferable that the tooth-tip segments a and tooth-root segments d of both the pin gear 400 and the non-instantaneous-pole enveloping gear 500 each are formed by spline surface. An option is that, for the pin gear 400, the elliptical cone segment b, the plane segment c and the tooth-root segment d at one end of the tooth-tip segment a and those at the other end are symmetrically arranged. Similarly, for the non-instantaneous-pole enveloping gear 500, the non-instantaneous-pole enveloping surface e, the plane segment c and tooth-root segment d at one end of the tooth-tip segment a and those at the other end are symmetrically arranged.

Traditionally, the design of pin gear 400 is always based on the concept of pitch cone. The so called pitch cone means relative movement between a pair of two gears could be considered as the pure rolling of the pitch cones of the two gears in relative to each other in sense of kinematics. The common tangent line between the pitch cones is termed as instantaneous pole or instantaneous line, which means the instantaneous relative movement between the two gears could be considered as the rotation about the instantaneous line. Traditionally, in gear designing, the instantaneous line generally lies in vicinity of the midpoint of effective tooth segment. However, in this embodiment, it is unnecessary to consider the instantaneous line in tooth profile designing at all, which means that no instantaneous line exists within the effective tooth profile. Therefore, the effective tooth surface on mating gear could be referred to as a non-instantaneous-pole enveloping surface. According to this design concept, the tooth profile extends around the reference cone. If there is no inner reference cone in the gear pair, inner bevel gear can be avoided and consequently end-face engagement could be realized. Thus the axial size of the gear pair is greatly reduces, and the power density of the gear pair is enhanced.

In this embodiment, as a result of a fact that the elliptical cone segment b servers as the effective tooth surface of the pin gear, in place of involute or cycloidal gear pair used in conventional nutation reducer, not only various interference problems associated with end-face-engaged involute gears (such as tip interference, tooth profile overlap, and so on) is avoided, but also the problems and defects of end-face-engaged cycloidal gear pairs such as large relative curvature between tooth surfaces and small width of effective tooth surface segment in the pin gear, which may lead to quick wearing, are eliminated.

By means of adopting the end-face-engaged gear pair with one-teeth difference, the enveloping gear 500 or the pin gear 400 has to rotate nearly 180° about their respective axes to bring a tooth of the enveloping gear from a completely disengaged state, in which the tip of said tooth points to the tooth tip of the gear 400, into a state in which said tooth totally enters the tooth space of the pin gear 400. However, if two-teeth-difference gear pair is used, in order to fulfill the above mentioned state transition, the enveloping gear or the pin gear only needs to rotate 90°. Beyond ±90° from the point where the tooth of the enveloping gear completely enters the tooth space of the mating gear, the two gears may be in the completely disengaged state, in which the face cones of the two gears completely stand away from each other, such that it's impossible for them to be in meshing engagement at all. Therefore, the end-face-engaged gear pair with one-teeth difference is adopted in the present disclosure, which can double the number of simultaneously contacting tooth pairs in comparison with the gear pairs having the same tooth number but with two-teeth difference.

The shaft angle of the gear pair is determined based on the full tooth depth of the gear pair, such that not only the effective tooth surface can totally get into engagement, but also no interference occurs between the tooth tips of the two gears during a whole turning thereof. As a result, the shaft angle should be at least smaller than the supplementary angle of a value resulted from arc tangent calculation of a quotient that is obtained by dividing the average full depth by the cone distance of the gear pair. The shaft angle in practice should be slightly smaller to ensure a reasonable minimum clearance between the tooth tips where the teeth of the gears are out of engagement. For a certain tooth profile designing, the full depth coefficient of the gear pair is generally fixed, the ratio of the full depth to cone distance will decrease linearly with the increasing of the tooth number in gear pair, so that for a nutation gear pair with small tooth number difference, the larger the transmission ratio, the more approaching the shaft angle is to 180°. For this embodiment, the pin gear 400 utilizes an annular spring film 103 as the output mechanism, which will be described in details in below. As mentioned above, the less the tooth number in the pin gear 400, the smaller the shaft angle is. However, too small shaft angle will disadvantageously affect the stress and strain state in the annular spring film 103 which is used as the output mechanism. As a result, the shaft angle has to be less than 180° to realize the nutational movement. On the other hand, the upper limit of the tooth number is constrained by the transmission efficiency of the reducer mechanism, because larger transmission ratio leads to smaller transmission efficiency. For this embodiment, the shaft angle T between the pin gear 400 and the non-instantaneous-pole enveloping gear 500 lies in a range of: $177° \leq T \leq 180°$.

The preferred ratio of major axis to minor axis in the elliptical cone segment b could be within a range of 1.3-2.5. Too smaller ratio may lead to increased contact stress between tooth surfaces, and the function of increasing the length of the effective tooth profile is not so obvious. On the other hand, if the ratio is too large, interference may occur between the tooth surfaces, and number of tooth pairs that simultaneously work may be reduced.

An option is that the tooth depth of the pin gear 400 gradually decreases radially inwardly to avoid the interference during engagement.

An option is that, a first reference cone lies between the face cone and root cone of the pin gear 400, wherein the axis of the first reference cone is coincident with the axis of the pin gear, and the first reference cone has an cone angle $\beta$; a second reference cone lies between the face cone and root cone of the non-instantaneous-pole enveloping gear 500, wherein the axis of the second reference cone is coincident with the axis of the non-instantaneous-pole enveloping gear, and the second reference cone has a cone angle W; a shaft angle T is formed between the axis of the pin gear 400 and that of the non-instantaneous-pole enveloping gear 500, the pin gear 400 has a face angle $\gamma$ and a root angle P; the non-instantaneous-pole enveloping gear 500 has a face angle K, and a root angle L, where the relationship between $\beta$, W, T, $\gamma$, K, L can be described as follows:

$$89° \leq \beta \leq 91°, \ W = T - \beta, \ \beta + 0.3° \leq \gamma \leq \beta + 2.1°,$$
$$\beta - 2.9° \leq P \leq \beta - 0.5°, \ W + 0.3° \leq K \leq W + 2.3°,$$
$$W - 3.1° \leq L \leq W - 0.6°.$$

By means of optimizing above parameters, it is possible to further increase the arc length of the effective tooth surface of the pin gear, reduce the contact stress in the teeth, and improve load capacity of the gear pair.

The cone angle of the first reference cone refers to the angle between the generatrix of the first reference cone and the axis thereof, and the cone angle of the second reference cone refers to the angle between the generatrix of the second reference cone and axis thereof. When the pin gear 400 performs a nutational movement on the non-instantaneous-pole enveloping gear 500, the first reference cone will keep in tangent to with the second reference cone from outside.

By means of compulsive addendum modification, the reference cone of the pin gear 400 can nearly be a plane. In this way, the shaft angle between the pin gear 400 and the mating gear is increased, which makes it possible to use the spring film as the output mechanism, and to maximize the number of the simultaneously working tooth pairs.

The pressure angle α of the effective tooth surface of the pin gear 400 satisfies the condition of 40°-R≤α≤50°-R, where R is the friction angle between the tooth surface of the pin gear 400 and that of the non-instantaneous-pole enveloping gear 500. In this way, the friction loss is reduced, and the mechanical efficiency is improved. By means of determining the range of the working pressure angle based on modified friction coefficient, it is possible for the reducer to achieve the maximum possible transmission efficiency, to extend the service life of the bearing. If the friction coefficient is within the range of about 0.08-0.1, the transmission efficiency of the gear pair can reach about 80-83% if not taking the friction loss in bearing into account.

Several gear pairs having different parameter values composed of the pin gear 400 and the non-instantaneous-pole enveloping gear 500 are listed as follows:

Optionally, the number of teeth in the pin gear 400 is 45; the number of teeth in the non-instantaneous-pole enveloping gear 500 is 44; the shaft angle of the gear pair is 178.02726°, the pin gear 400 has the outer diameter of 165 mm, the face width of 25 mm, the reference cone angle of 90° (predetermined), the face angle of 91.48813°, and the root angle of 87.51994°; the non-instantaneous-pole enveloping gear 500 has the reference cone angle of 88.02726° (computed), the face angle of 90.38022°, and the root angle of 86.41190°.

Optionally, the number of teeth in the pin gear 400 is 120; the number of teeth in the non-instantaneous-pole enveloping gear 500 is 119; the shaft angle of the gear pair is 179.25997°, the pin gear 400 has the outer diameter of 165 mm, the face width of 25 mm, the reference cone angle of 90° (predetermined), the face angle of 90.55853°, and the root angle of 89.06907°; the non-instantaneous-pole enveloping gear 500 has the reference cone angle of 89.25997° (computed), the face angle of 90.14317°, and the root angle of 88.65370°.

Optionally, the number of teeth in the pin gear 400 is 160; the number of teeth in the non-instantaneous-pole enveloping gear 500 is 159; the shaft angle of the gear pair is 179.44496°, the pin gear 400 has the outer diameter of 80 mm, the face width of 12 mm, the reference cone angle of 90° (predetermined), the face angle of 90.41893°, and the root angle of 89.30179°; the non-instantaneous-pole enveloping gear 500 has the reference cone angle of 89.44496° (computed), the face angle of 90.10740°, and the root angle of 88.99022°.

The gear pair according to this embodiment is nutation gear pair, in which the effective tooth surfaces of the pin gear are designed as an elliptical cone segment. As a result, the arc length of the effective tooth surface of the pin gear can be increased, local wear in the tooth surface is reduced, and service life is prolonged. By means of using this kind of gear pair in nutation reducer, the service life of the nutation reducer can be obviously prolonged. Meanwhile, by means of optimization of the tooth profile parameters such as the reference cone angle, the face angle, the root angle and so on, the arc length of the effective tooth surface of the pin gear can be increased by 60% in comparison with pin-cycloid gear pair, and also local wear can be obviously reduced, and service life is prolonged.

Embodiment 2

A nutation reducer is provided in the present embodiment, as illustrated in FIG. 9 to FIG. 11, FIG. 13 and FIG. 16, which nutation reducer comprises: a case 300; an output shaft 301 of the reducer which is rotationally provided in the case 300; the gear pair mentioned in embodiment 1, with the non-instantaneous-pole enveloping gear 500 being provided within the case 300 in a fixed manner or integrally formed with the case 300; an annular spring film 103 having an inner ring 101 which is coaxial with the output shaft 301, an outer ring 102 which is coaxial with the pin gear 400, and an annular elastically deformable portion connected between the inner and outer rings 101, 102, with the inner ring being provided with a first connecting part fixed to the output shaft 301 and the outer ring being provided with a second connecting part fixed to the pin gear 400; an actuator mechanism for nutational movement, which is provided in the case 300 for driving the pin gear 400 to perform nutational movement, such that the teeth of the pin gear 400 roll on the teeth of the non-instantaneous-pole enveloping gear 500, and the elastically deformable portion is deformable to adapt the nutational movement of the pin gear 400.

Optionally, both the first and second connecting parts are constructed as reamed hole. The inner ring 101 is fixed to the output shaft 301 by hinged bolts, and the outer ring 102 is fixed to the pin gear 400 by hinged bolts.

Optionally, the inner ring 101 and outer ring 102 each are provided as a flange, allowing them to be easily bolted to the output shaft 301 and the pin gear 400, respectively. The inner ring 101 is coaxial with the output shaft 301, while the outer ring 102 is coaxial with the pin gear 400. In assembled state, the axis of the inner ring 101 is not parallel to but angled to the axis of outer ring 102, that is, the annular spring film 103 is elastically deformable to adapt the nutational movement of the pin gear 400. The annular spring film 103 can be formed by means of pre-stretching. Preferably, the annular elastically deformable portion takes a form of annular bulge which is convex in one side and concave in the other side, wherein the inner ring 101 is tangent to the inner periphery of the elastically deformable portion, while the outer ring 102 is tangent to the outer periphery of the elastically deformable portion. Further, the concave and convex surfaces of the bulge are formed by circular arc camber, spline surface or cosine surface. By forming the annular spring film 103 to have the annular bulge shape, the axis of the inner ring 101 would be angular shifted from the axis of the outer ring 102 under the force exerted by the pin gear 400 such that the axes would intersect with each other, and no torsional deformation is produced in the film, leading to a higher transmission accuracy. Since the deflection direction of the inner ring 101 in relative to the outer ring 102 just corresponds to the direction of the radial load on the spring film, the bulge could be always stretched in that direction, and the stress and strain for stretching the bulge into a plane can be ignored. As a result, not only the radial rigidity of the annular spring film 103 is enhanced, but also its safety factor against elastic instability is improved. By providing the spring film 103 with an amount of pre-stretching to compensate the stretching of spring film 103 during assembling, the assemble stress in the spring film 103 can be substantially reduced. An appropriate amount of pre-stretching will hardly lead to decrease of the radial rigidity of spring film 103, but excessive pre-stretching may reduce the radial rigidity, even lead to elastic instability.

The annular spring film 103 has advantages of: firstly, no theoretical kinematic errors being resulted, that is, the rotation angle transmitted to the output shaft 301 of the reducer theoretically strictly corresponding to the spinning angle of the pin gear 400, and the rigidity of the output mechanism remaining constant under any rotation angle, no errors of angular fluctuation produced in the output rotation; secondly, little energy loss and no additional heat generated in the spring film; thirdly, the spring film also playing a role of a knuckle bearing, that is, an additional bearing being no more necessary, and the spring film itself bearing the radial load from the pin gear 400, the centering of the pin gear 400 being realized. In comparison with traditional knuckle bearing, the structure is much more compact and the inner volume of the reducer is reduced. For the same output torque, the reducer will have a smaller volume, thereby it applies to an even wider range of fields.

Furthermore, the nutation reducer according to the embodiment further comprises an input shaft 716 of the reducer, which is rotationally provided in the case 300. The actuator mechanism for nutational movement in this embodiment comprises: a rotatable tilted disc 600 provided on the input shaft 716 of the reducer, one side of the tilted disc 600 being tilted, while the other side being perpendicular to the axis of the tilted disc 600; a driving mechanism, which drives the tilted disc 600 to rotate; planar high-density ball bearings 200, each of which is provided at either side of the tilted disc 600; an annular raised platform 300a which is radially inwardly protruded from the inner surface of the case 300 around the input shaft 716 and has a side contacting balls of the planar high-density ball bearing 200, a side of the annular raised platform 300a being perpendicular to the axis of the input shaft 716, the end face of the annular raised platform 300a, the back side of the pin gear 400 and both sides of the tilted disc 600 serve as the raceways for the planar high-density ball bearings 200. For this embodiment, the raceways for planar high-density ball bearings 200 are planar. For this embodiment, the balls in one of the planar high-density ball bearings 200 contact with a lateral end face of the annular raised platform 300a and a side of the tilted disc 600, while the balls in the other planar high-density ball bearing 200 contact with the other side of the tilted disc 600 and the back side of the pin gear 400. In this embodiment the planar raceways for the planar high-density ball bearings 200 are preferable. When the tilted disc 600 rotates, the tilted surface 601 of the tilted disc 600 drives the pin gear 400 to perform nutational movement, resulting in the teeth in the pin gear 400 rolling on the teeth in the non-instantaneous-pole enveloping gear 500. Provided the tooth number of the pin gear 400 is i and the tooth number of the non-instantaneous-pole enveloping gear is i−1, the speed ratio will be 1:i, achieving a high gear ratio.

Figure 14:
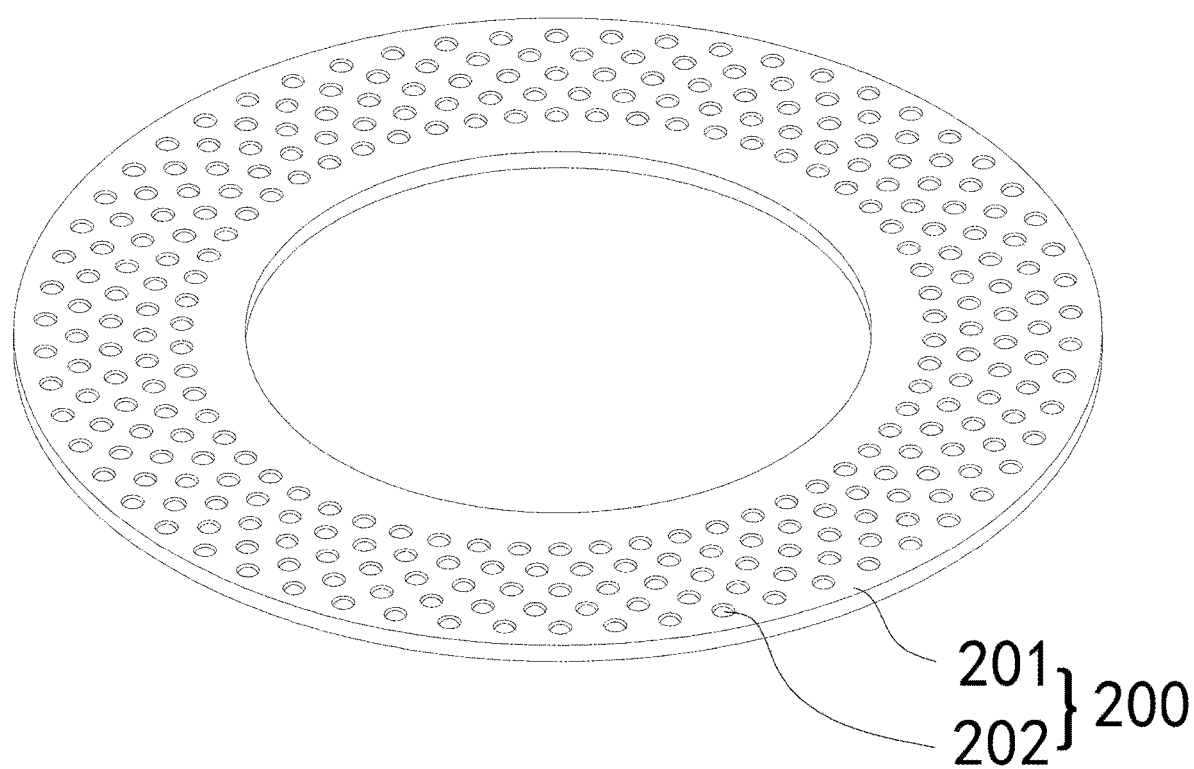
FIG. 14 is an isometric view of an embodiment of a planar high-density ball bearing to be used in the nutation reducer in FIG. 10 and FIG. 13.
Figure 15:
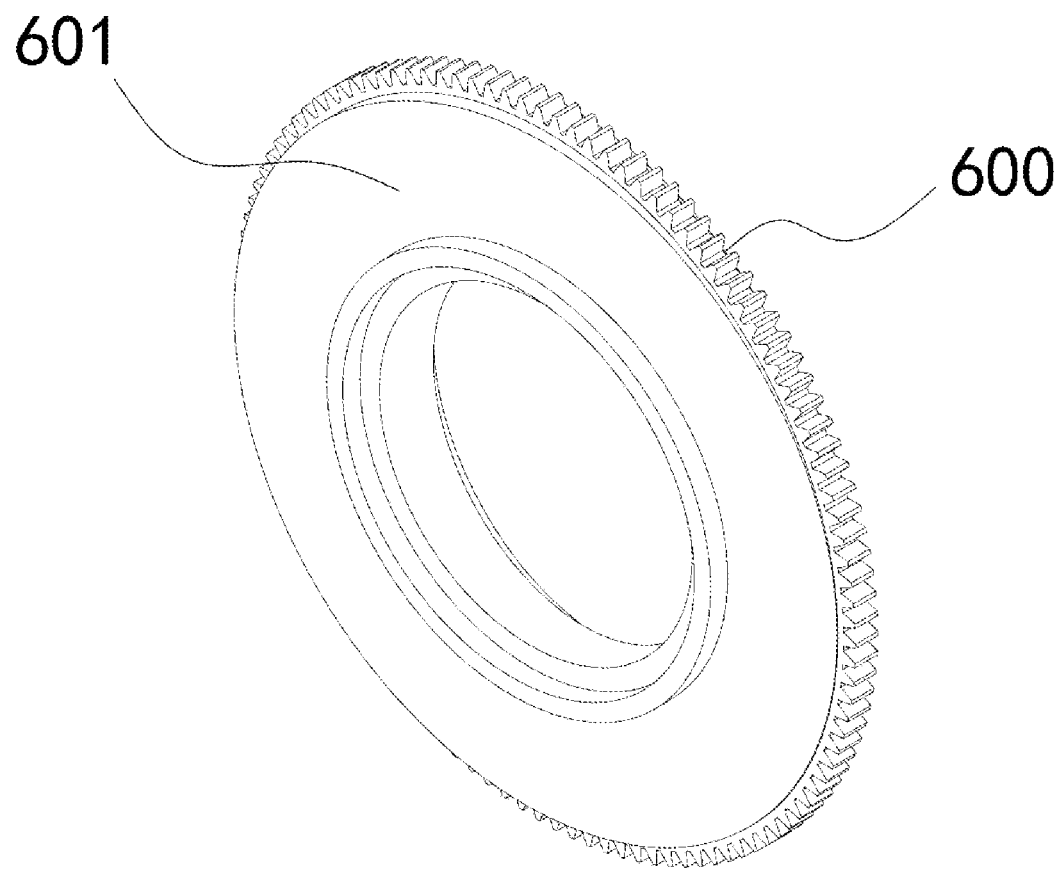
FIG. 15 is an isometric view of an embodiment of a tilted disc in FIG. 13.
Figure 16:
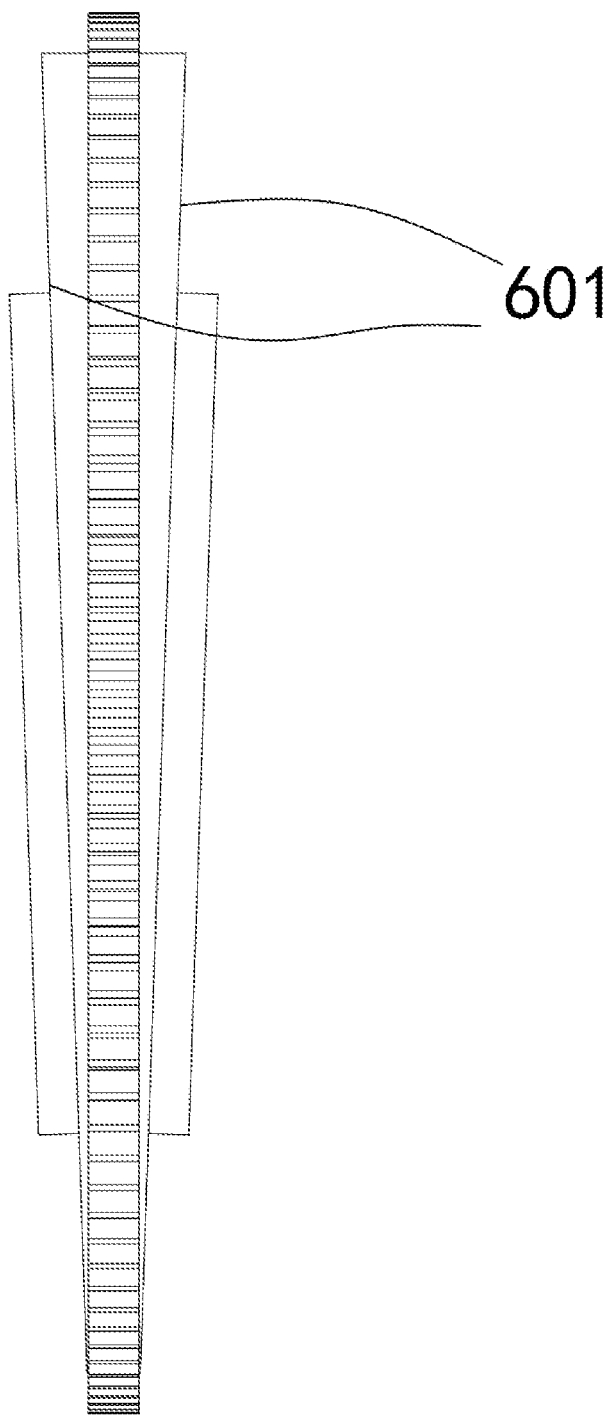
FIG. 16 is a side view of the embodiment of the tilted disc in FIG. 15.
Figure 17:
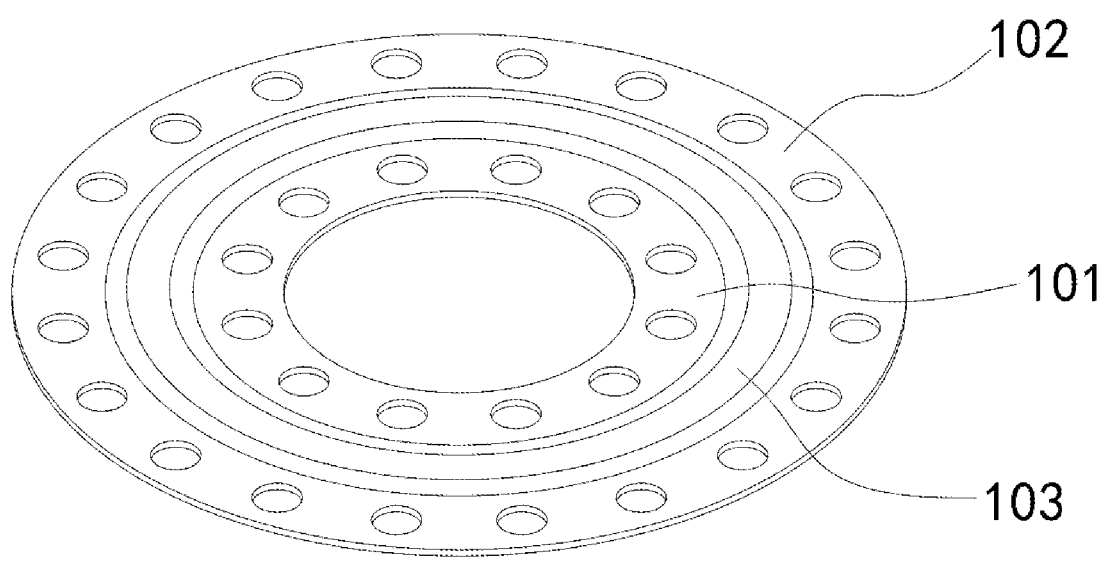
FIG. 17 is a schematic view of an embodiment of an annular spring film to be used in the nutation reducer of FIG. 10 and FIG. 13.

As illustrated in FIG. 14, the planar high-density ball bearing according to the embodiment comprises: a ball holder 201 provided with multiple groups of ball holes. In each ball hole, a ball 202 is located such that it protrudes from both side of the ball holder. Each group of the ball holes are distributed in ellipse, the radius of which varies among the groups. Each group of balls is distributed in a full ellipse. The major axes of the respective ellipses for respective groups of the ball holes lie in a common line, and the centers of the respective ellipses coincide with each other. The ball holes in adjacent groups are arranged in a staggered pattern. In this embodiment, the distance between a ball hole in any group and its nearest ball hole in the adjacent group is less than two times of the ball diameter, thereby ensuring a high-density arrangement of the balls. What needs to be specially noted is that, it is possible to arrange the balls in circles in this embodiment. However, the elliptic arrangement may be preferable, so as to avoid earlier fatigue pitting.

In embodiment 1, the pressure angle α of the effective teeth surface of the pin gear 400 satisfies the requirement of $40°\text{-}R \leq \alpha \leq 50°\text{-}R$. The reason why the pressure angle is a little less than the theoretically optimal pressure angle in the sense of the efficiency of the gear pair lies in that the larger the pressure angle, the higher the normal pressure exerted by the balls of the planar high-density ball bearing on their counter surface is and the greater the friction loss is. Thus, the optimal pressure angle in the sense of the efficiency of whole reducer will be a little less than that obtained by only considering the efficiency of the gear pair itself. In addition, the load capacity of the planar high-density ball bearing has already reached its critical state.

A further option is that, the driving mechanism is an electric motor 900, the output shaft of which is fixed to the tilted disc 600 and used as the input shaft 716 of the reducer to drive the tilted disc 600 to rotate. The case 300 serves as a housing of the electric motor 900, in which both the stator and rotor of the electric motor 900 are provided, the input shaft 716 (i.e., the output shaft of the electric motor) is fixed to the tilted disc 600, the shaft of the electric motor 900 is rotationally provided in the case 300. A further option is that, said case 300 is used as the housing of said electric motor 900, the stator of the electric motor 900 is embedded into the case 300, and the rotor of the electric motor 900 is rotationally arranged within the case 300, so as to reduce the volume of the reducer.

In this embodiment, the case 300 may be composed of two parts, i.e. a first case part and a second case part, which two are fastened together by bolts to form the case 300, wherein the non-instantaneous-pole enveloping gear 500 can be integrally formed with the first case part and provided therein, while the second case part serves as the housing of the electric motor 900 in which the stator is embedded, the rotor of the electric motor 900 is rotationally provided in the second case part to cooperate with the stator. The shaft of the electric motor 900 is coaxial with axis of the ball holder and of the tilted disc 600. In this way, it is possible to simplify the internal structure of the reducer, make the reducer more compact. In comparison with existing reducer, for the same output torque, it has a smaller volume.

A further option is that, an angle C is formed between the tilted plane 601 of the tilted disc 600 and the axis of the tilted disc 600, and a shaft angle T is formed between the axis of the pin gear 400 and the axis of the non-instantaneous-pole enveloping gear 500, wherein C=T−90°, which may allow the pin gear 400 performing the nutational movement in range of the shaft angle.

The tilted disc 600 in the actuator mechanism for nutational movement is driven by the shaft of the electric motor 900 to rotate, causing the pin gear 400 perform nutational movement on the planar high-density ball bearing 200 and roll on the non-instantaneous-pole enveloping gear 500. During the nutational movement of the pin gear 400, the annular spring film 103 deforms, and the torque is transmitted from the pin gear 400 to the output shaft 301 of the reducer to realize power output, which achieves not only a rather high mechanical efficiency, but also a more compact reducer by incorporating the annular spring film 103 therein, so that the reducer may applies to a greater variety of circumstances, especially in narrow space.

For the purpose of better understanding, the construction of the reducer is described in details by way of example as follows. However, this is not a limitation to the extent of protection of this disclosure.

Figure 8:
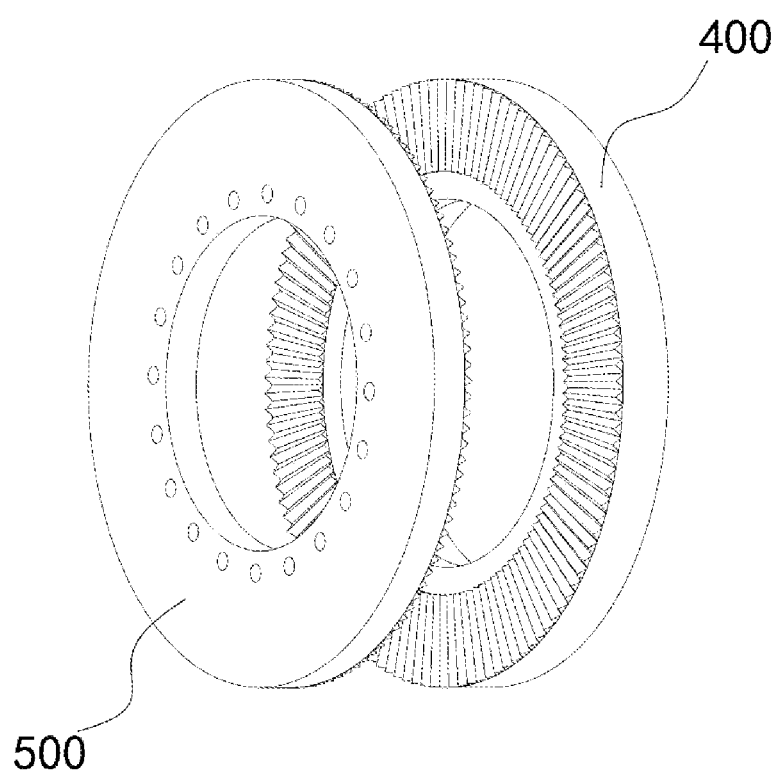
FIG. 8 is an explosive view of FIG. 7.
Figure 9:
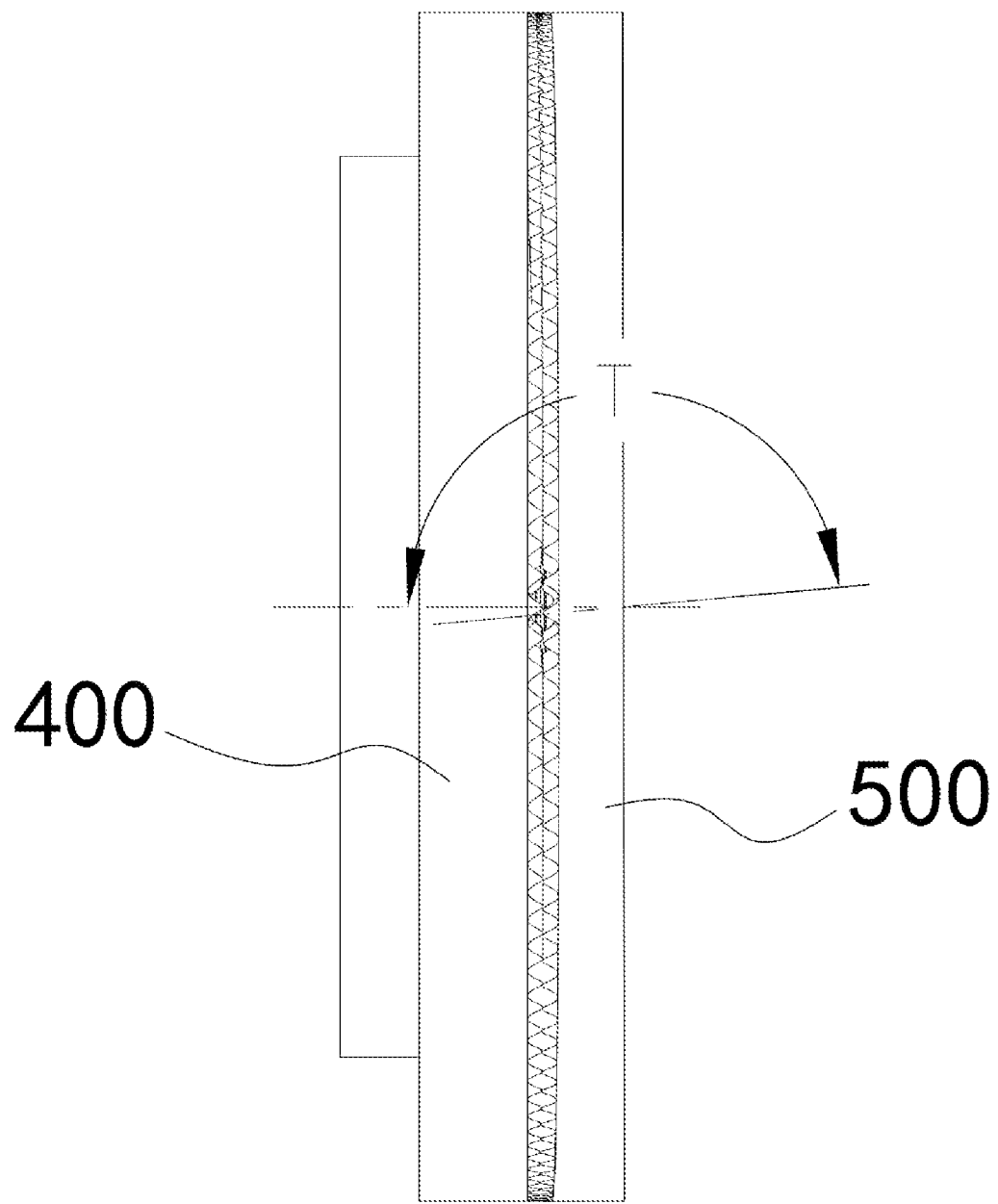
FIG. 9 is a front view of the embodiment of the gear pair presented in FIG. 7.
Figure 10:
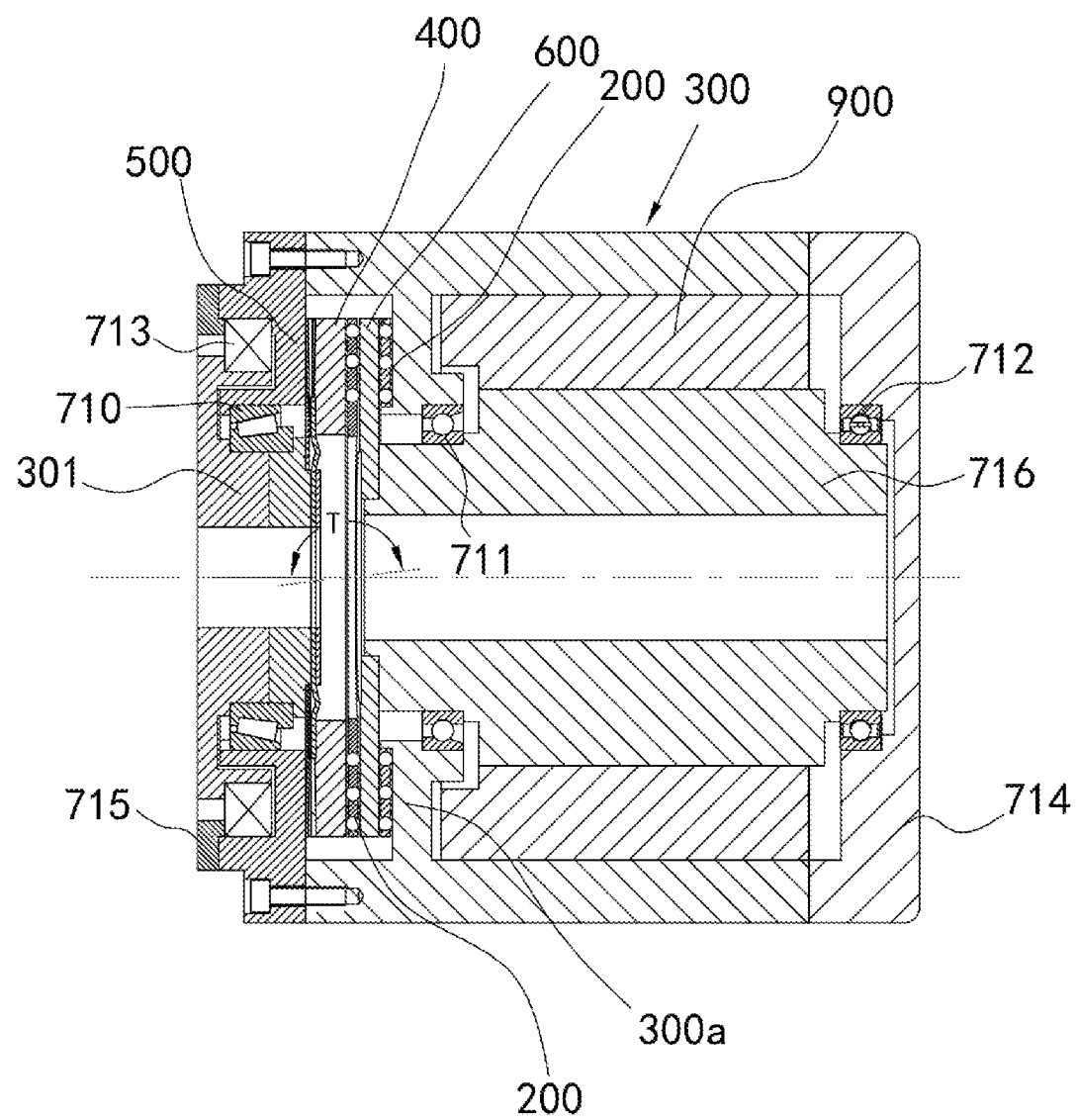
FIG. 10 is a view showing an overall construction of a nutation reducer according to the first embodiment of the present disclosure, in which the inventive gear pair is used.
Figure 11:
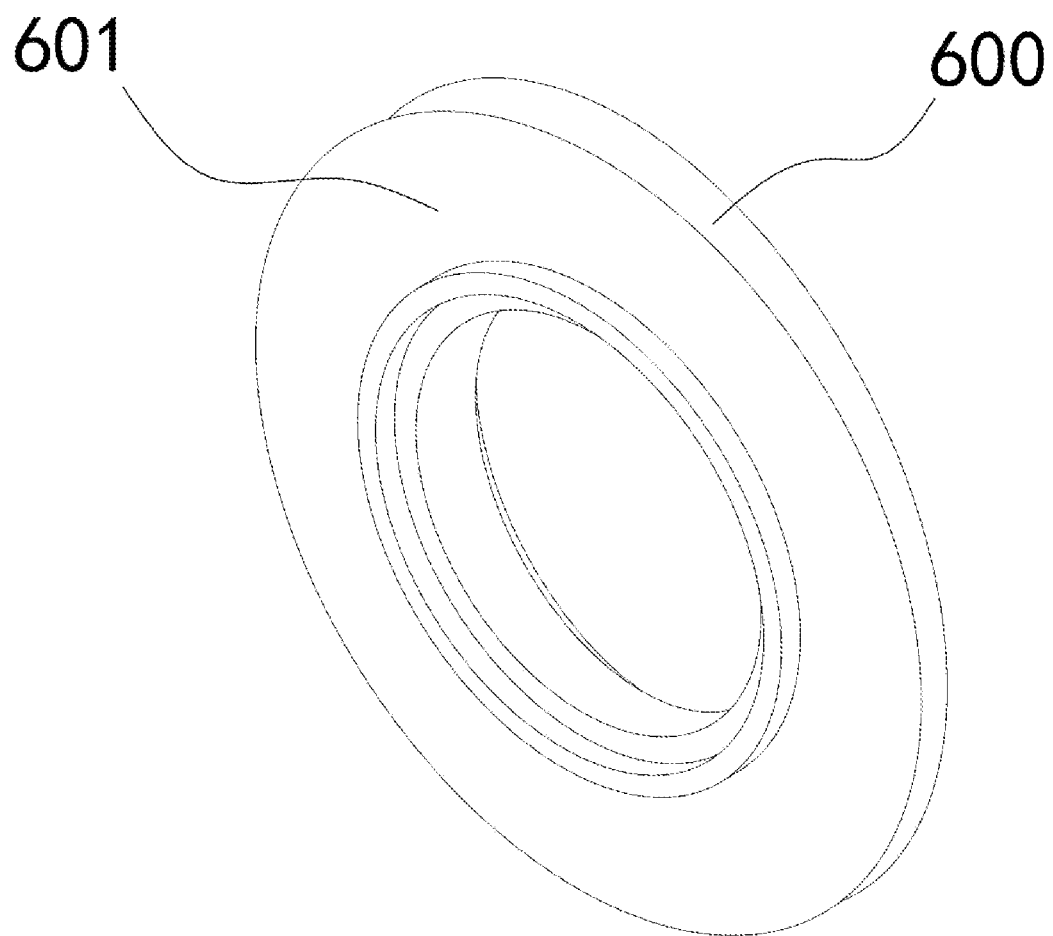
FIG. 11 is an isometric view of the tilted disc shown in FIG. 10.
Figure 12:
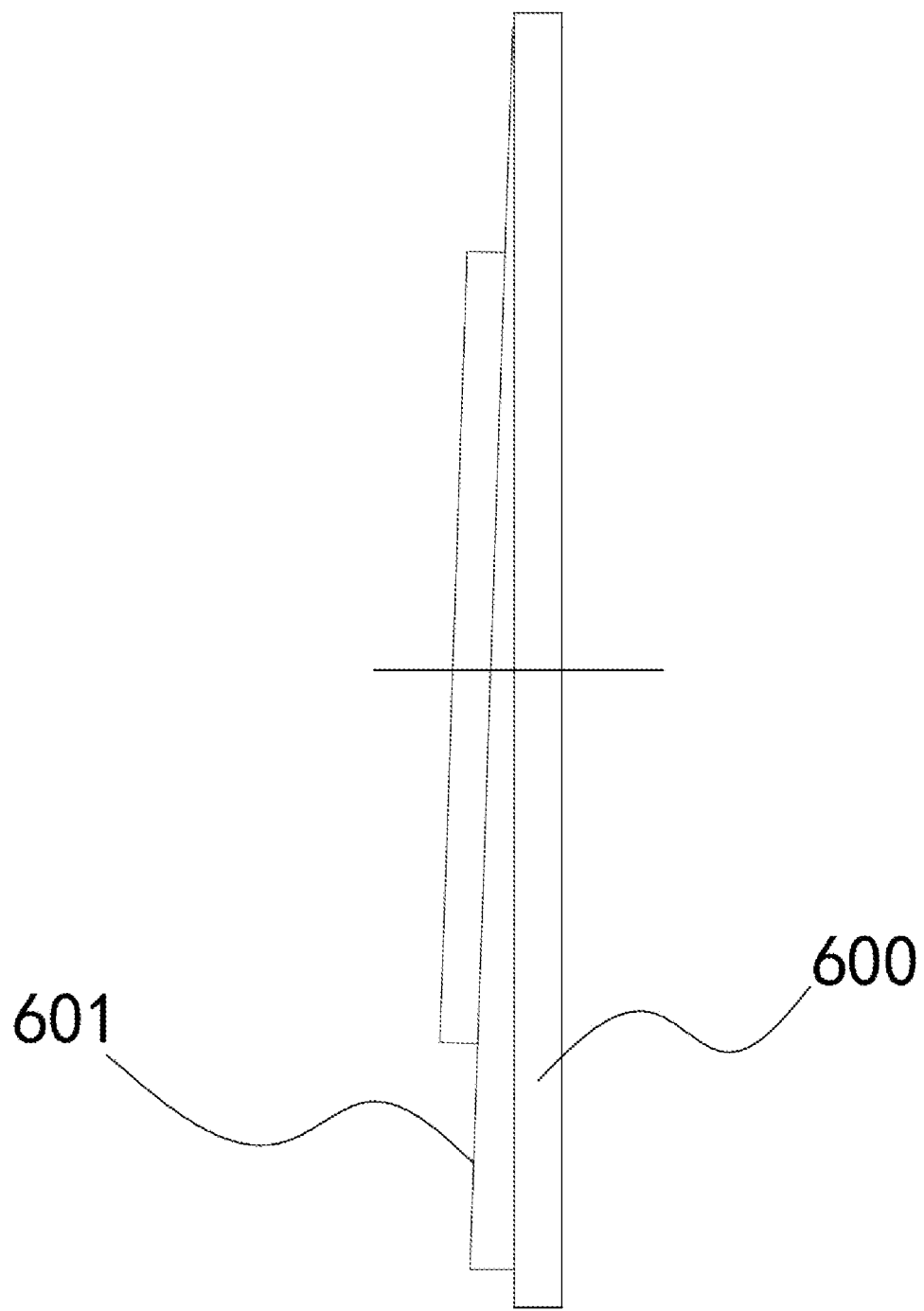
FIG. 12 is a side view of FIG. 11.
Figure 13:
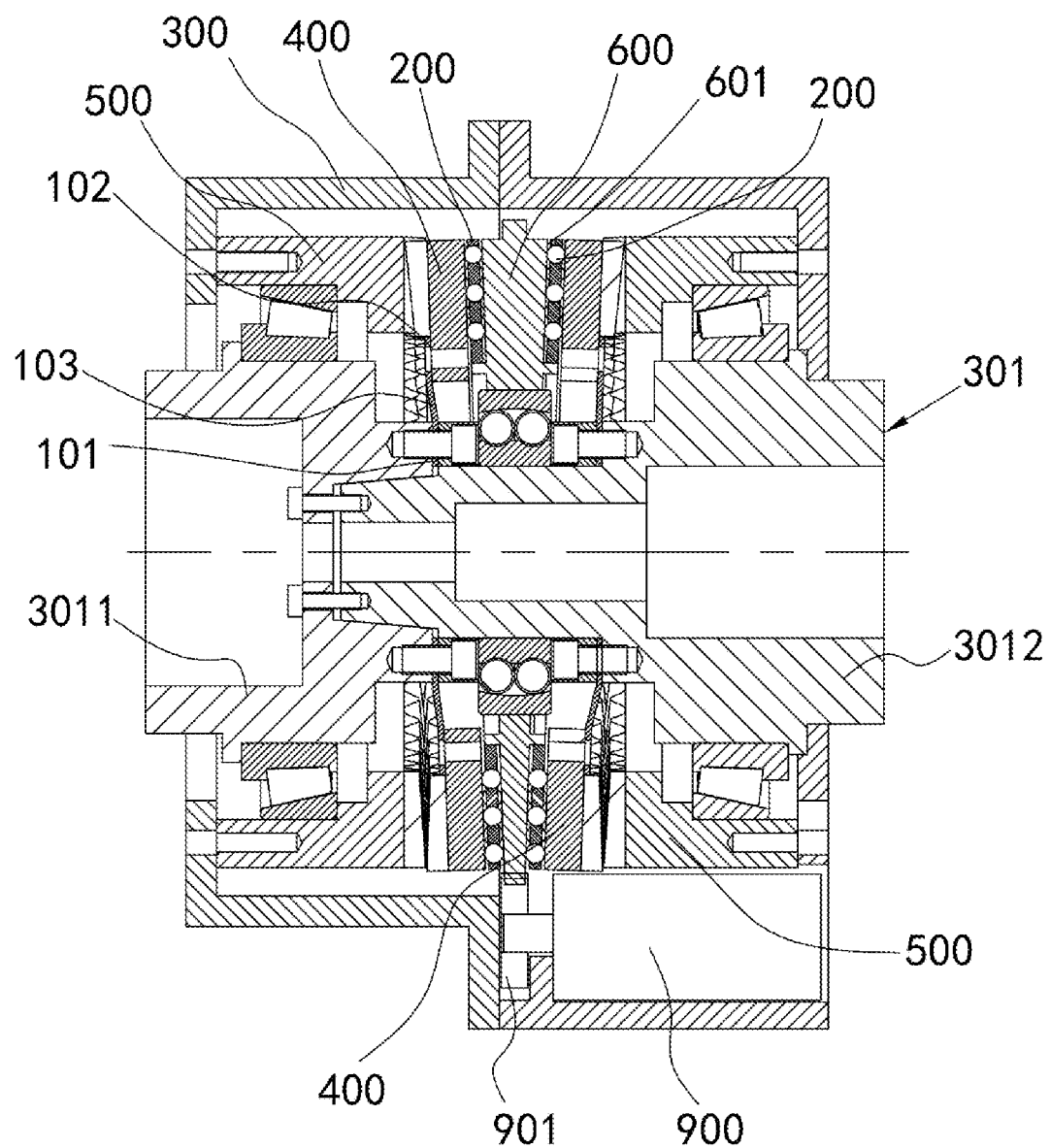
FIG. 13 is a view showing an overall construction of a nutation reducer according to the second embodiment of the present disclosure, in which the inventive gear pair is used.

As illustrated in FIG. 8, the non-instantaneous-pole enveloping gear 500 is fixed to the front end (the output end of the electric motor) of the case 300, which serves as the housing of the motor 900. The stator of the electric motor is embedded into the case 300, the rotor of the electric motor is fixed to the shaft (the input shaft 716 of the reducer) to cooperates with the stator. The motor shaft (the input shaft 716 of the reducer) is rotationally installed in the case 300 through a first bearing 711 at its front end, optionally, the first bearing 711 being an angular contact ball bearing. The rear end of the motor shaft is rotationally connected to an end cover 714 of the electric motor through a second bearing 712, optionally, the second bearing being a deep groove ball bearing. The end cover 714 of the electric motor is fixed to rear end of the case 300. In the case 300, an annular raised platform 300a is formed around the front part of the shaft of the electric motor. A first annular rim is formed on the annular raised platform 300a on its side facing towards the planar high-density ball bearing 200. A positioning bore is formed in the ball holder 201 of the planar high-density ball bearing 200, which positioning bore receives the first annular rim and fits it with clearance, whereby the radial positioning of the planar high-density ball bearing 200 is achieved. The shaft 716 of the electric motor is fixed to the side of the tilted disc that is perpendicular to the axis of the tilted disc 600. A second annual rim is formed on the tilted side 601 of the tilted disc 600, which second annual rim is received by the positioning bore in the mid of the ball holder 201 of the planar high-density ball bearing 200, whereby the radial positioning of the planar high-density ball bearing 200 is achieved. A first and second bearing mounting bores for the third and fourth bearings, respectively, are formed in the non-instantaneous-pole enveloping gear 500 such that they are coaxial with the axis of the gear 500. The mounting directions for the third and fourth bearing are inverse to each other. On the output shaft 301 of the reducer a first bearing mounting part rotationally arranged in the first bearing mounting bore through a third bearing 710 and a second bearing mounting part rotationally arranged in the second bearing mounting bore through a fourth bearing 713 are provided. The fourth bearing 713 is positioned by abutting against a bearing end cover 715 with its bearing cup. The bearing end cover 715 is fixed to the back side of the non-instantaneous-pole enveloping gear 500. Optionally, the third bearing 710 is a taper roller bearing, while the fourth bearing is RV-80E that is a specially designed for RV-80E reducer. The inner ring 101 of the annular spring film 103 is fixed to an end face of the reducer output shaft 301 facing toward the shaft 716 of the electric motor through hinged bolts. The inner ring 101 is coaxial with the output shaft 301 of the reducer. The outer ring 102 of the spring film 103 is fixed to the pin gear 400 through hinged bolts. The outer ring 102 is coaxial with the pin gear 400. The teeth in the pin gear 400 engage with the teeth in the non-instantaneous-pole enveloping gear 500, and the shaft angle T between the axes of the pin gear 400 and non-instantaneous-pole enveloping gear 500 is less than 180°. The output shaft 301 of the reducer may comprise a first shaft segment and an output flange. The output flange may be formed on the output shaft 301 of the reducer and fixed to the inner ring 101 of the spring film by hinged bolts. Meanwhile the output flange can also be connected to the first shaft segment by hinged bolts, thereby fixing the bearing cone of the third bearing 710 to archive axial positioning of the output shaft 301 of the reducer.

Embodiment 3

Another kind of nutation reducer is provided in this embodiment, as illustrated in FIG. 12 to FIG. 16. The nutation reducer further comprises: a case 300; an output shaft 301 of the reducer, rotationally provided in the case 300; a gear pair described in embodiment 1, wherein the non-instantaneous-pole enveloping gear 500 being provided in the case 300 in a fixed manner or integrally formed with the case 300; an annular spring film 103, which is provided with a first connecting part in its inner ring 101, and a second connecting part in its outer ring 102, the first connecting part being fixed to the output shaft 301, while the second connecting part being fixed to the pin gear 400; an actuator mechanism for nutational movement, which is provided in the case 300, to drive the pin gear 400 to perform nutational movement, such that the teeth of the pin gear 400 roll on the teeth of the non-instantaneous-pole enveloping gear 500.

Furthermore, two gear pairs are symmetrically provided on two opposite sides of the actuator mechanism for nutational movement.

Furthermore, the actuator mechanism for nutational movement comprises: a tilted disc 600, rotationally provided on the output shaft 301 in the case 300 and driven to rotate by a driving mechanism, wherein two tilted planes 601 being symmetrically provided on two opposite sides of the tilted disc 600; planar high-density ball bearings 200, each of which is arranged on either side of the tilted disc 600. Both sides of the tilted disc 600 together with the back sides of pin gears in both gear pairs serve as the raceways for the planar high-density ball bearings 200. The two pin gears 400 in the two nutational gear pairs have the same tooth number.

In this embodiment, the planar high-density ball bearing 200 has the same construction as that described in connection with embodiment 2.

Optionally, the output shaft 301 is composed of two parts, i.e., the first output shaft 3011 of the reducer and the second output shaft 3012 of the reducer. Bearing mounting bores, in which taper roller bearings are installed, are formed in the back side of the non-instantaneous-pole enveloping gears 500. The first output shaft of the reducer is rotationally installed in the bearing cone of the taper roller bearing, and the second output shaft is rotationally installed in the case through the taper roller bearing. Both the first and second output shafts are provided with conical surfaces, through which they fittingly engage with each other and then are fixed together by bolts. Thus the axial force generated during the nutation movement of the pin gear is balanced by the first and second output shafts, torque can be transmitted through the cones to constantly output movement with phase synchronization. The tilted disc rides on the output shaft through a bearing which can be a self-aligning bearing.

Furthermore, an angle C is formed between the tilted plane 601 and the axis of the tilted disc 600, a shaft angle T is formed between the axis of the pin gear 400 and the axis of the non-instantaneous-pole enveloping gear 500, where C=T−90°.

In this embodiment, two gear pairs with pin gears 400 are symmetrically arranged at two opposite sides of the tilted disc 600, and two symmetric tilted planes 601 are formed on two opposite sides of the tilted disc 600. When the tilted disc 600 rotates, the two pin gears 400 are simultaneously driven to perform nutational movement and utilize the same output shaft 301 to output the torque. In this way, under the same output torque, the friction loss between the planar high-density ball bearing 200 and the pin gear 400 and between the planar high-density ball gear 200 and the tilted disc 600 can be reduced by 50% to a value which is approximately equal to the transmission ratio multiplied by 0.0005. For a single stage reducer in which the transmission ratio reaches about 160, reduced friction loss is nearly equal to one half of the friction loss between tooth surfaces. As a result, the transmission efficiency of the reducer is substantially improved.

According to the embodiment, gear teeth are formed in the outer circumference of the tilted disc. The driving mechanism comprises the electric motor 900 and a pinion 901 which is in mesh engagement with the gear teeth in the tilted disc and is driven by the electric motor such that the tilted disc is driven to rotate.

Figure 18:
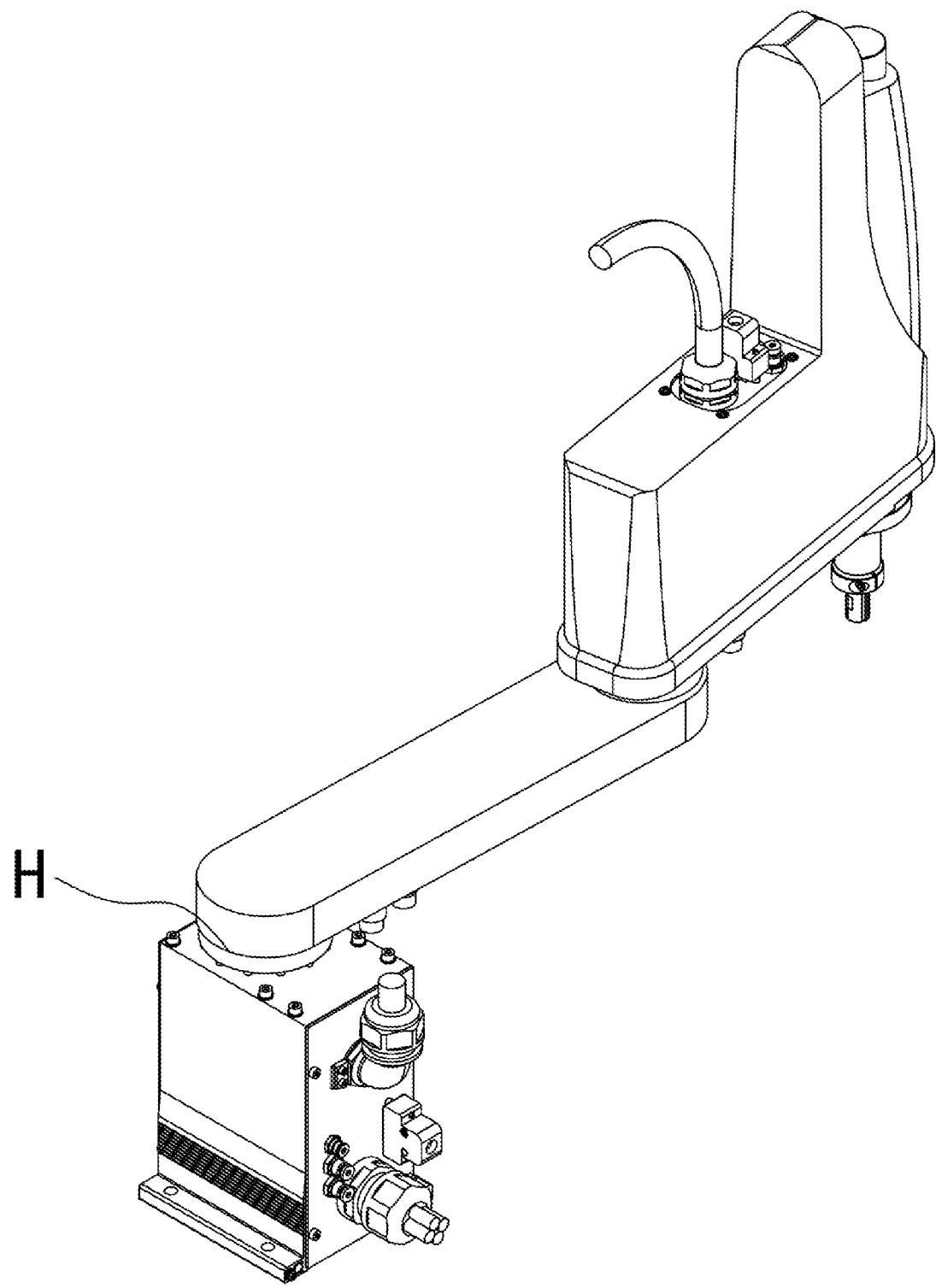
FIG. 18 is a schematic view of SCARA robotic arms in which embodiments of the nutation reducer according to the present disclosure is used.

The gear pair of end-face-engagement type comprises the pin gear with elliptical cone segment and the non-instantaneous-pole enveloping gear described in embodiment 1, and the nutation reducer incorporating the gear pair of end-face-engagement type (the nutation reducer exemplified in embodiment 2 and 3) applies to various automatic equipment, especially various series robotic arms and parallel manipulators, such as robotic arms used in automobile assembly line, surgical robot, robotic arms for automatic loading and unloading used in automatic manufacturing lines, SCARA robotic arms for automatic lines, and so on. FIG. 18 illustrates a nutation reducer H used in SCARA robotic arm.

By means of the tilted disc 600 with double tilted planes 601 together with the pin gears 400 mirror-symmetrically arranged in a single reducer, power density in the reducer device can be substantially enhanced, meanwhile the friction loss in bearing is reduced, and the transmission efficiency of the reducer device is improved. This arrangement is especially suitable for the situation where double output ends of the reducer is required, it is also suitable for swaying joints in series robotic arms.

The foregoing specifically illustrates and describes exemplary embodiments of the present disclosure. It is to be understood that the present disclosure is not limited to the detailed structures, set-ups, or methods of implementation described herein; rather, the present disclosure is intended to cover a variety of modifications and equivalents that are within the spirit and scope of the appended claims.

The invention claimed is:

1. A gear pair comprising a pin gear and a non-instantaneous-pole enveloping gear which are in meshing engagement with each other, wherein tooth surface of the pin gear comprises effective tooth surface and ineffective tooth surface, the effective tooth surface of said pin gear is formed by an elliptical cone segment which is outwardly convex, in which surface segment the distance between the highest and lowest points in the same cross-section gradually decreases inwardly along the generatrix of the reference cone of said pin gear; wherein said effective tooth surface of said non-instantaneous-pole enveloping gear being the non-instantaneous-pole envelope of said pin gear in the non-instantaneous-pole enveloping process which is created on the non-instantaneous-pole enveloping gear during the nutational movement between the gear pair, wherein the number of teeth in said pin gear is one more than that in said non-instantaneous-pole enveloping gear.

2. A gear pair as claimed in claim 1, wherein the ineffective tooth surface of said pin gear comprises a curved tooth-tip segment, a flat plane segment, and a curved tooth-root segment, said curved tooth-tip segment, said elliptical cone segment, said flat plane segment and said curved tooth-root segment are configured as the tooth surface of the pin gear, wherein said elliptical cone segment, said plane segment and said tooth-root segment are consecutively arranged one beside another at both ends of said tooth-tip segment, wherein every adjacent two of said tooth-tip segment, said elliptic conical surface segment, said plane segment and said tooth-root segment are tangent to each other, wherein said tooth-tip segment is smoothly convexly curved, and said tooth-root surface is smoothly concavely curved; and wherein said non-instantaneous-pole enveloping gear has a tooth surface comprising a curved tooth-tip surface, a non-instantaneous-pole enveloping tooth surface, a flat plane segment and a curved tooth-root segment, wherein said non-instantaneous-pole enveloping tooth surface, said plane segment and said tooth-root segment are consecutively arranged one beside another at both ends of said tooth-tip segment, every adjacent two of said tooth-tip segment, said non-instantaneous-pole enveloping tooth surface, said plane segment and said tooth-root segment are tangent to each other, said tooth-tip segment is smoothly convexly curved, and said tooth-root segment is smoothly concavely curved.

3. A gear pair as claimed in claim 2, wherein said tooth-tip segment and said tooth-root segment each are formed by spline surface.

4. A gear pair as claimed in claim 1, wherein the shaft angle T between the axis of said pin gear and that of said non-instantaneous-pole enveloped gear lies within a range of $177° \leq T \leq 180°$.

5. A gear pair as claimed in claim 1, wherein the ratio of major axis to minor axis of elliptical cone lies within a range of 1.3 to 2.5.

6. A gear pair as claimed in claim 1, wherein said pin gear has a tooth depth which gradually decreases radially inwardly.

7. A gear pair as claimed in claim 1, wherein said effective tooth surface of said pin gear has a pressure angle $\alpha$ that satisfies requirement of $40°-R \leq \alpha \leq 50°-R$; wherein R is the friction angle between the tooth surface of said pin gear and that of said non-instantaneous-pole enveloping gear.

8. A gear pair as claimed in claim 1, wherein of said pin gear has a first reference cone between its face cone and root cone, wherein axis of said first reference cone is coincident with that of said pin gear, and wherein said first reference cone has a cone angle $\beta$; said non-instantaneous-pole enveloping gear has a second reference cone between its face cone and root cone, wherein axis of said second reference cone is coincident with that of said non-instantaneous-pole enveloping gear, and wherein said second reference cone has a cone angle W; said gear pair has a shaft angle T between axis of said pin gear and that of said non-instantaneous-pole enveloped gear, said pin gear has a face angle $\gamma$ and a root angle P; said non-instantaneous-pole enveloping gear has a face angle K and a root angle L, the relationship between $\beta$, W, T, $\gamma$, K, L is described as follows:

$$89° \leq \beta \leq 91°, \ W=T-\beta, \ \beta+0.3° \leq \gamma \leq \beta+2.1°,$$
$$\beta-2.9° \leq P \leq \beta-0.5°, \ W+0.3° \leq K \leq W+2.3°,$$
$$W-3.1° \leq L \leq W-0.6°.$$

9. A nutation reducer comprising:
a case;
an output shaft rotationally provided in said case;
a gear pair as claimed in claim 1, wherein said non-instantaneous-pole enveloping gear is provided in said case in a fixed manner, or integrally formed with said case;
an annular spring film, having an inner ring provided with a first connecting part fixed to said output shaft, an outer ring provided with a second connecting part fixed to said pin gear, and an annular elastically deformable portion connected between said inner and outer rings, wherein said inner ring is coaxial with said output shaft of said reducer, while said outer ring is coaxial with said pin gear;
an actuator mechanism for nutational movement, provided in said case, to actuate said pin gear to perform nutational movement such that teeth of said pin gear roll on teeth of said non-instantaneous-pole enveloping gear and said annular elastically deformable portion deforms to adapt said nutational movement of said pin gear.

10. A nutation reducer as claimed in claim 9, wherein said nutation reducer further comprises an input shaft of said reducer, which is rotationally provided in said case;
wherein said actuator mechanism for nutational movement comprises
a rotatable tilted disc provided on said input shaft of said reducer, wherein one side of said tilted disc forms a tilted plane, while the other side is perpendicular to axis of said tilted disc;
a driving mechanism driving said tilted disc to rotate;
planar high-density ball bearings provided at both sides of said tilted disc;
an annular raised platform radially inwardly protruded from the inner surface of said case around said input shaft, wherein the side of said platform contacts said planar high-density ball bearing, the side of said platform is perpendicular to axis of said input shaft;
wherein the end face of said platform, back side of said pin gear, and both sides of said tilted disc serve as raceways for said planar high-density ball bearings.

11. A nutation reducer as claimed in claim 10, wherein said driving mechanism is an electric motor, the output shaft of which is fixed to said tilted disc and thus used as said input shaft of said reducer for driving said tilted disc to rotate.

12. A nutation reducer as claimed in claim 11, wherein said case of said reducer serves as a housing for said electric motor, in which stator of said electric motor is embedded and within which rotor of said electric motor is rotationally provided.

13. A nutation reducer as claimed in claim 10, wherein two gear pairs are provided such that they are arranged at two opposite sides of said actuator mechanism for nutational movement in a symmetric manner.

14. A nutation reducer as claimed in claim 13, wherein said actuator mechanism for nutational movement comprises:
a tilted disc rotationally provided in said case on said output shaft of said reducer and driven by an actuating mechanism, wherein two opposite sides of said tilted disc form a pair of symmetric tilted planes;
planar high-density ball bearings provided at both sides of said tilted disc in a symmetric manner such that both sides of said tilted disc and back sides of said pin gears in each said two gear pairs serve as raceways for said planar high-density ball bearings;
wherein said pin gears in said two gear pairs have the same number of teeth.

15. A nutation reducer as claimed in claim 10, wherein an angle C is formed between said tilted plane of said tilted disc and axis of said tilted disc and a shaft angle T between axis of said pin gear and that of said non-instantaneous-pole enveloped gear, where $C=T-90°$.

\* \* \* \* \*